US009690126B2

(12) United States Patent
Iwasaki

(10) Patent No.: US 9,690,126 B2
(45) Date of Patent: *Jun. 27, 2017

(54) IMAGE PICKUP APPARATUS, IMAGE PICKUP METHOD, AND PROGRAM

(71) Applicant: Sony Corporation, Tokyo (JP)

(72) Inventor: Masanori Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/840,938

(22) Filed: Aug. 31, 2015

(65) Prior Publication Data

US 2016/0054603 A1 Feb. 25, 2016

Related U.S. Application Data

(63) Continuation of application No. 14/328,113, filed on Jul. 10, 2014, now Pat. No. 9,148,555.

(30) Foreign Application Priority Data

Jul. 25, 2013 (JP) .................................. 2013-154456

(51) Int. Cl.
*H04N 5/225* (2006.01)
*G02F 1/13* (2006.01)
(Continued)

(52) U.S. Cl.
CPC ........... *G02F 1/1313* (2013.01); *G02B 5/201* (2013.01); *G02B 27/28* (2013.01); *G02B 27/286* (2013.01);
(Continued)

(58) Field of Classification Search
None
See application file for complete search history.

(56) References Cited

U.S. PATENT DOCUMENTS 6,636,278 B1 10/2003 Dultz et al.
6,876,412 B2 4/2005 Udaka et al.
(Continued)

FOREIGN PATENT DOCUMENTS

JP 05-048060 A 2/1993
JP 2005-173493 6/2005

*Primary Examiner* — James Hannett
(74) *Attorney, Agent, or Firm* — Michael Best & Friedrich LLP

(57) ABSTRACT

An image pickup apparatus includes: a polarization removing element layer including a plurality of polarization removing elements, each of the plurality of polarization removing elements being configured to polarize an incident light to thereby obtain light having a polarization axis in a predetermined direction and to transmit the polarized light; a polarizer layer provided in front of the polarization removing element layer, the polarizer layer being configured to twist polarization axes of light having a plurality of polarization axes by predetermined angles, respectively, and to transmit the light; an inclination detecting device configured to detect inclination of the incident light to an optical axis; a controller configured to control and drive the polarizer layer such that the polarizer layer twists the polarization axis of light depending on the inclination detected by the inclination detecting device and transmits the light; and an image pickup device configured to detect the light.

25 Claims, 17 Drawing Sheets

(51) Int. Cl.
*G02F 1/1335* (2006.01)
*G02B 27/28* (2006.01)
*G06T 5/50* (2006.01)
*H04N 5/235* (2006.01)
*H04N 9/04* (2006.01)
*G02F 1/01* (2006.01)
*G02F 1/137* (2006.01)
*G02B 5/20* (2006.01)
*G02F 1/133* (2006.01)
*G02B 13/00* (2006.01)

(52) U.S. Cl.
CPC ........ *G02F 1/0136* (2013.01); *G02F 1/13318* (2013.01); *G02F 1/13725* (2013.01); *G02F 1/133528* (2013.01); *G06T 5/50* (2013.01); *H04N 5/2254* (2013.01); *H04N 5/2355* (2013.01); *H04N 9/045* (2013.01); *G02B 13/0085* (2013.01); *G02F 2001/133531* (2013.01)

(56) References Cited

U.S. PATENT DOCUMENTS

| | | |
|---|---|---|
| 6,919,982 B2 | 7/2005 | Nimura et al. |
| 7,057,683 B2 | 6/2006 | Udaka et al. |
| 9,148,555 B2 * | 9/2015 | Iwasaki ................ H04N 5/2254 |
| 2002/0135729 A1 | 9/2002 | Tokita et al. |
| 2003/0090012 A1 | 5/2003 | Allen et al. |
| 2005/0157247 A1 | 7/2005 | Yanagida |
| 2011/0043623 A1 | 2/2011 | Fukuta et al. |
| 2012/0127404 A1 | 5/2012 | Takada |
| 2012/0147280 A1 | 6/2012 | Osterman et al. |

* cited by examiner

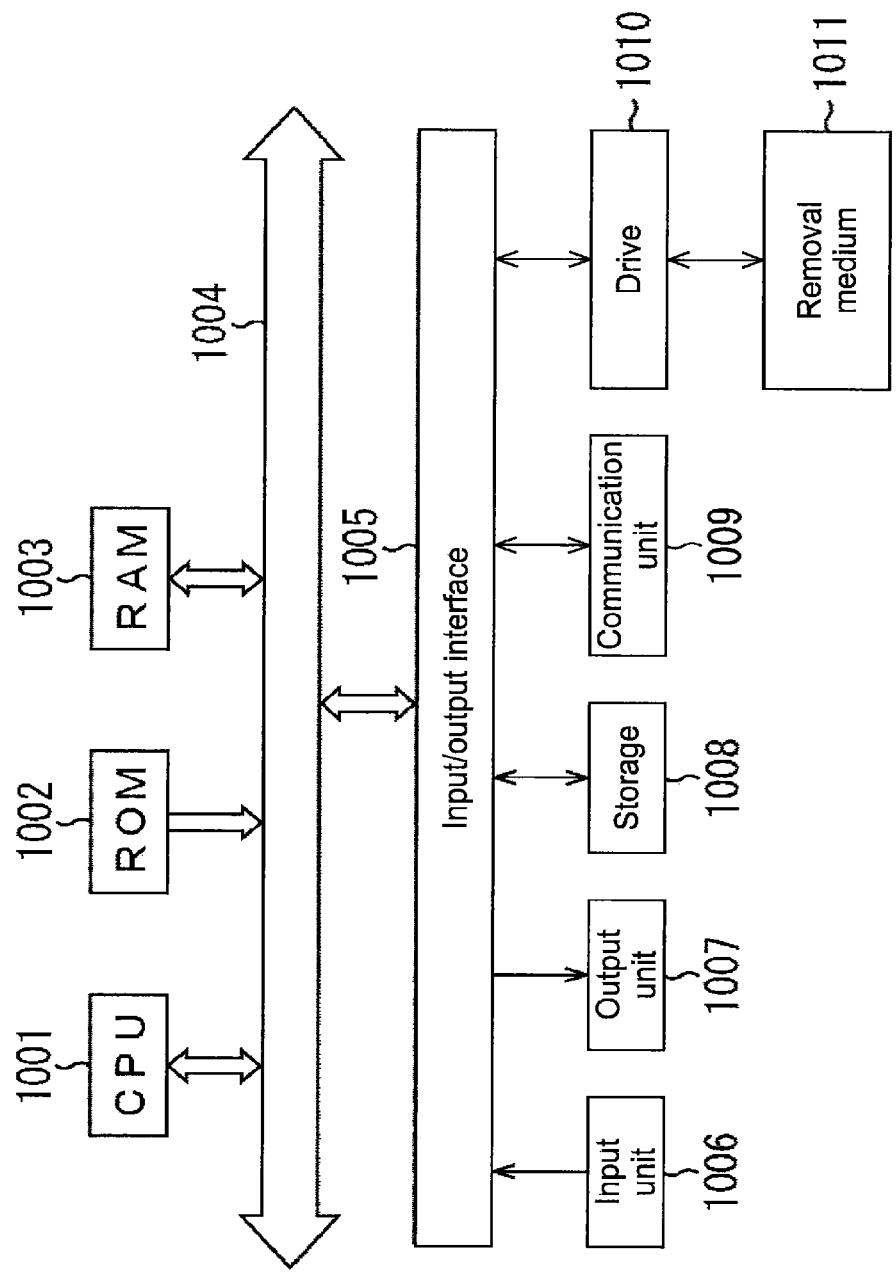

IMAGE PICKUP APPARATUS, IMAGE PICKUP METHOD, AND PROGRAM

CROSS REFERENCE TO RELATED APPLICATIONS

The present application is a Continuation of U.S. application Ser. No. 14/328,113, filed Jul. 10, 2014, which claims the benefit of Japanese Priority Patent Application JP 2013-154456 filed Jul. 25, 2013, the entire contents of which are incorporated herein by reference.

BACKGROUND

The present disclosure relates to an image pickup apparatus, an image pickup method, and a program. Specifically, the present disclosure relates to an image pickup apparatus, an image pickup method, and a program capable of removing a polarization component appropriately even if an image-pickup posture is changed, and capable of taking an image from which a polarization component is removed appropriately.

In the past, there is used the following technology, to which a technology of extracting a polarization component is applied. A polarization filter is mechanically inserted in/removed from an optical path of a camera manually or automatically. The polarization filter is configured to absorb or reflect a polarization component to be removed. As a result, a desired polarization component is extracted. A taken image includes the extracted desired polarization component.

Further, the following technology is also used. That is, a physical polarizer is provided. A polarizer is rotated electrically in order to take an image including orthogonal polarization components.

However, according to the technology of extracting a polarization component mechanically by inserting/removing a polarization filter or by rotating a polarizer, the size of the apparatus structure is increased. In view of this, there is proposed a technology of extracting a polarization component electrically.

There is proposed the following technology, to which a technology of electrically extracting a polarization component is applied. That is, a polarization control device uses a GH (Guest-Host) liquid crystal (also referred to as dichroism liquid crystal). The GH liquid crystal only absorbs a predetermined polarization component. The polarization control device controls transmittance. As a result, an unpolarized natural light is modulated, and an image is taken (see Japanese Patent Application Laid-open No. 2005-173493). In the polarization control device, two GH liquid crystal layers are arranged as follows. That is, a polarization axis of one polarization component is orthogonal to a polarization axis of the other polarization component. The two GH liquid crystals are turned on/off alternately. As a result, the image pickup device transmits only one polarization component out of the light, which enters the image pickup device from the outside-light incident side.

Further, there is also proposed the following technology employing the GH liquid crystal. That is, one GH liquid crystal layer functions as a CF (Color Filter) of one polarization component. As a result, a ND (Neutral Density) filter and a device configured to detect arbitrary polarization are realized (see Japanese Patent Application Laid-open No. H05-048060).

SUMMARY

Meanwhile, let's say that the above-mentioned technology of Japanese Patent Application Laid-open No. 2005-173493 is applied to a camera. In this case, when an image having an arbitrary polarization component is to be taken, if a camera is inclined, the polarization orientation of an object (objective world) is deviated from the polarization orientation of the camera. As a result, the predetermined polarization component may not be absorbed well. Extraction of light having the only predetermined polarization component may be failed.

More specifically, as shown in the upper part of FIG. 1, the camera 11 is arranged in the horizontal direction appropriately. In this image-pickup posture (camera orientation is appropriate), the horizontal polarization component is to be transmitted. The GH liquid crystal GH1 is configured to absorb the perpendicular polarization component. The GH liquid crystal GH1 is turned off (i.e., absorbs the perpendicular polarization component). The GH liquid crystal GH2 is configured to absorb the horizontal polarization component. The GH liquid crystal GH2 is turned on (i.e., does not absorb the horizontal polarization component). As a result, both the GH liquid crystals GH1 and GH2 do not absorb the polarization component of the incident light from the object in the horizontal direction. As a result, the horizontal polarization component passes through the GH liquid crystals GH1 and GH2. As a result, the image Ph1 having the horizontal polarization component is extracted as it is as the image Ph11. The image Ph11 is a transmitted light having the horizontal polarization component.

Meanwhile, the GH liquid crystal GH1 absorbs the polarization component of the incident light from the object in the perpendicular direction. As a result, the polarization component may not pass through the GH liquid crystal GH1. The image Pv1 has the perpendicular polarization component. The image Pv1 is extracted as the image Pv11. The image Pv11 has darkened transmitted light.

As a result, the image Pv11 having the perpendicular polarization component is darkened. Substantially, the image Ph11 having the horizontal polarization component is only extracted.

However, as shown in the lower part of FIG. 1, for example, the camera 11' is inclined at 45 degrees to the horizontal direction. In this image-pickup posture (camera orientation is inclined at 45 degrees), the GH liquid crystal GH1, which is configured to absorb the perpendicular polarization component, is turned off (i.e., absorbs the perpendicular polarization component). The GH liquid crystal GH2, which is configured to absorb the horizontal polarization component, is turned on (i.e., does not absorb the horizontal polarization component). Even in this case, because both the GH liquid crystals GH1 and GH2 are inclined at 45 degrees, the GH liquid crystal GH1 absorbs a part of the horizontal polarization component out of the incident light from the object. However, a part of the horizontal polarization component passes through the GH liquid crystal GH1. As a result, the image Ph1, which includes light having amplitude in the horizontal direction, is extracted as the image Ph1'. The image Ph11' includes transmitted light, which is obtained by reducing a part of the polarization component by the GH liquid crystal GH1.

Meanwhile, the GH liquid crystal GH1 also absorbs a part of light having amplitude in the perpendicular direction out of the incident light from the object. However, a part of light having amplitude in the perpendicular direction passes through the GH liquid crystal GH1. As a result, the image Pv1 including the perpendicular polarization component is extracted as the image Pv11'. The image Pv11' includes transmitted light, which is obtained by reducing a part of the polarization component by the GH liquid crystal GH1, similar to the image Pf11'.

As a result, the dark image Pv11' including the perpendicular polarization component is extracted. The dark image Ph11' including the amplitude component in the horizontal direction is extracted. As a result, a dark image is merely obtained as a whole (i.e., darkened image is merely obtained). It may not be able to extract an image including a predetermined polarization component.

Further, the following technique may be employed. That is, a polarization filter is mechanically inserted in/removed from an optical path of a camera. The polarization filter is configured to absorb or reflect a polarization component to be removed. However, according to this structure, it is necessary to operate two orthogonal polarization filters at high speed. In this case, there is a limit of speed when polarization components are obtained.

Further, the size and weight may be increased because it is necessary to provide a mechanical mechanism. Further, when a camera is inclined, a polarization component to be reduced will not be reduced sufficiently. In addition, the signal level of the polarization component to be detected simultaneously will be decreased.

Further, when a camera is inclined, it is necessary to prepare a polarization filter, which is configured to rotate the polarization direction depending on the inclination of the camera, and to insert/remove the polarization filter in order to detect the polarization component with a high degree of accuracy. Because of this, it is necessary to further add a mechanical mechanism. Alternatively, it is necessary to prepare a large variety of polarization filters having different polarization orientations, respectively.

Further, according to the technology disclosed in Japanese Patent Application Laid-open No. H05-048060, one GH liquid crystal layer functions as a CF (Color Filter), which filters only one polarization component. Because of this, even if the GH liquid crystal layer functions as a color filter, an unattenuated polarization component remains. As a result, an ND filter may not be realized, or a device configured to detect an arbitrary polarization may not be realized.

Further, even if two GH liquid crystal layers are provided and they function as ND filters, a polarization component to be reduced will not be reduced sufficiently. In addition, the signal level of the polarization component to be detected simultaneously will be decreased.

In view of the above-mentioned circumstances, it is specifically desirable to remove a polarization component appropriately even if a camera orientation is changed, and to take an image including a polarization component removed appropriately.

According to an embodiment of the present technology, there is provided an image pickup apparatus, including: a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element; a polarizer layer provided in front of the polarization removing element layer, the polarizer layer being configured to twist polarization axes of light having a plurality of polarization axes by predetermined angles, respectively, and to transmit the light; an inclination detecting device configured to detect inclination of the incident light to an optical axis; a controller configured to control and drive the polarizer layer such that the polarizer layer twists the polarization axis of light depending on the inclination detected by the inclination detecting device and transmits the light; and an image pickup device configured to detect the light passing through the polarization removing element layer.

The polarizer layer may include a twisted nematic liquid crystal layer.

The controller may be configured to control a twist angle of nematic liquid crystal molecules in the twisted nematic liquid crystal layer between about 0 degrees to 270 degrees depending on the inclination detected by the inclination detecting device.

The image pickup apparatus may further include matrix wiring configured to apply voltage to the twisted nematic liquid crystal layer.

The twisted nematic liquid crystal layer may be divided into a plurality of areas, each of the plurality of areas corresponding to at least one pixel, the wiring being arranged in the matrix form such that the wiring corresponds to the plurality of areas.

The image pickup apparatus may further include an optimizer processor configured to apply subtraction, enhancement, and correction processing to an image detected by the image pickup device. A pixel array may include a pixel of at least one color having a great effect on brightness, and includes pixels having color combination of at least three colors, the controller may be configured to drive the polarization removing element layer and the polarizer layer corresponding to a pixel area of the color having a great effect on brightness, and the optimizer processor may be configured to compare activity of each pixel of a polarized image with activity of the corresponding pixel of a normal image, the polarized image being taken under a state where the polarizer layer is driven and including a pixel of a color having a great effect on brightness, the normal image being taken and including pixels excluding the pixel of the color having a great effect on brightness out of the pixels having color combination of at least three colors, and to generate a processed image including pixels each having higher activity.

The pixel array may be checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line, the controller may be configured to drive the polarization removing element layer and the polarizer layer corresponding to the pixel area of the second green pixel, and the optimizer processor may be configured to compare activity of each pixel of a polarized image with activity of the corresponding pixel of a normal image, the polarized image being taken under a state where the polarizer layer is driven and including the second green pixel, the normal image being taken and including the red pixel, the blue pixel, and the first green pixel, and to generate a processed image including pixels each having higher activity.

The pixel array may include two pixels in a horizontal direction and two pixels in a perpendicular direction for each unit, the pixel array including a red pixel, a blue pixel, a green pixel, and a white pixel, the controller may be configured to drive the polarization removing element layer and the polarizer layer corresponding to the pixel area of the white pixel, and the optimizer processor may be configured to compare activity of each pixel of a polarized image with activity of the corresponding pixel of a normal image, the polarized image being taken under a state where the polarizer layer is driven and including the white pixel, the normal image being taken and including the red pixel, the blue pixel, and the green pixel, and to generate a processed image including pixels each having higher activity.

The pixel array may be checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line, the controller may be configured to drive the polarization removing element layer corresponding to the pixel area of the first green pixel in one direction, and the polarization removing element layer corresponding to the pixel area of the second green pixel in a direction orthogonal to the one direction, and to drive the polarizer layer, and the optimizer processor may be configured to compare activity of each pixel of a first polarized image with activity of the corresponding pixel of a second polarized image, the first polarized image including the first green pixel, the red pixel, and the blue pixel, the second polarized image including the second green pixel, the red pixel, and the blue pixel, and to generate a processed image including pixels each having higher activity.

Each of the polarization removing elements may include a Guest-Host liquid crystal.

The controller may be configured to drive at least one Guest-Host liquid crystal out of the plurality of Guest-Host liquid crystals being the plurality of polarization removing elements.

The plurality of polarization removing elements may be two polarization removing elements, a polarization axis of one polarization removing element being orthogonal to a polarization axis of the other polarization removing element.

The image pickup apparatus may further include an optimizer processor configured to apply subtraction, enhancement, and correction processing to an image detected by the image pickup device.

A transparent layer may be provided on an image pickup device, a refractive index of the transparent layer being lower than a refractive index of an on-chip lens, the on-chip lens being structured on a pixel of the image pickup device, the polarizer being arranged in front of the transparent layer having the lower refractive index.

The polarization removing element may include a wire-grid polarizer.

According to an embodiment of the present technology, there is provided an image pickup method, executed by an image pickup apparatus including a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element, a polarizer layer provided in front of the polarization removing element layer, the polarizer layer being configured to twist polarization axes of light having a plurality of polarization axes by predetermined angles, respectively, and to transmit the light, an inclination detecting device configured to detect inclination of the incident light to an optical axis, a controller configured to control and drive the polarizer layer such that the polarizer layer twists the polarization axis of light depending on the inclination detected by the inclination detecting device and transmits the light, and an image pickup device configured to detect the light passing through the polarization removing element layer, the method including: detecting, by the inclination detecting device, inclination of the incident light to an optical axis; controlling and driving, by the controller, the polarizer layer such that the polarizer layer twists the polarization axis of light depending on the inclination detected by the inclination detecting device and transmits the light; and detecting, by the image pickup device, the light passing through the polarization removing element layer.

According to an embodiment of the present technology, there is provided a program, causing a computer configured to control an image pickup apparatus including a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element, a polarizer layer provided in front of the polarization removing element layer, the polarizer layer being configured to twist polarization axes of light having a plurality of polarization axes by predetermined angles, respectively, and to transmit the light, an inclination detecting device configured to detect inclination of the incident light to an optical axis, a controller configured to control and drive the polarizer layer such that the polarizer layer twists the polarization axis of light depending on the inclination detected by the inclination detecting device and transmits the light, and an image pickup device configured to detect the light passing through the polarization removing element layer, to execute the steps of: detecting, by the inclination detecting device, inclination of the incident light to an optical axis; controlling and driving, by the controller, the polarizer layer such that the polarizer layer twists the polarization axis of light depending on the inclination detected by the inclination detecting device and transmits the light; and detecting, by the image pickup device, the light passing through the polarization removing element layer.

According to an embodiment of the present technology, there is provided a camera system, including: a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element; a polarizer layer provided in front of the polarization removing element layer, the polarizer layer being configured to twist polarization axes of light having a plurality of polarization axes by predetermined angles, respectively, and to transmit the light; an inclination detecting device configured to detect inclination of the incident light to an optical axis; a controller configured to control and drive the polarizer layer such that the polarizer layer twists the polarization axis of light depending on the inclination detected by the inclination detecting device and transmits the light; and an image pickup device configured to detect the light passing through the polarization removing element layer.

According to an embodiment of the present technology, there is provided a camera main body, including: a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element; a polarizer layer provided in front of the polarization removing element layer, the polarizer layer being configured to twist polarization axes of light having a plurality of polarization axes by predetermined angles, respectively, and to transmit the light; an inclination detecting device configured to detect inclination of the incident light to an optical axis; a controller configured to control and drive the polarizer layer such that the polarizer layer twists the polarization axis of light depending on the inclination detected by the inclination detecting device and transmits the light; and an image pickup device configured to detect the light passing through the polarization removing element layer.

According to the embodiments of the present technology, an inclination detecting device is configured to detect inclination of the incident light to an optical axis. A controller is configured to control and drive the polarizer layer such that the polarizer layer twists the polarization axis of light depending on the inclination detected by the inclination detecting device and transmits the light. An image pickup device is configured to detect the light passing through the polarization removing element layer.

According to the embodiments of the present technology, it is possible to remove a polarization component appropriately, and to take an image including a polarization component removed appropriately.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 19 is a diagram illustrating an example of the structure of a general-purpose personal computer.

DETAILED DESCRIPTION OF EMBODIMENTS

Hereinafter, embodiments of the present disclosure will be described with reference to the drawings. Note that the embodiments will be described in the following order.

1. First embodiment (example of polarization control device having basic structure)

2. Second embodiment (example of integrally-provided polarization control device and on-chip lenses)

3. Third embodiment (example of dividing polarization control device into areas each including plurality of pixels, and controlling the polarization control device)

4. Fourth embodiment (example of dividing polarization control device for each set of RGB pixels, and controlling polarization control device)

5. Fifth embodiment (example of dividing polarization control device for each pixel, and controlling polarization control device)

6. Sixth embodiment (example of generating processed image based on polarized image only including second green pixels, which are subjected to polarization control, and based on normal image including the other pixels of checkered array of red, green, and blue pixels)

7. Seventh embodiment (example of generating processed image based on polarized image only including white pixels, which are subjected to polarization control, and based on normal image including the other pixels of 2 pixels.times.2 pixels array of red, green, blue, and white pixels)

8. Eighth embodiment (example of applying polarization control to first and second green pixels of checkered array of red, green, and blue pixels, and generating processed image based on first polarized image including first green, red, and blue pixels and based on second polarized image including second green, red, and blue pixels)

9. Ninth embodiment (example of providing on-chip lenses and color filters in front of polarization control device)

10. Tenth embodiment (example of providing on-chip lenses and color filters between TN liquid crystal and GH liquid crystals of polarization control device)

11. Eleventh embodiment (example of applying polarization-removing structural layer to polarization control device)

1. First Embodiment

Example of the Structure of a Camera of the Present Technology

Figure 1:
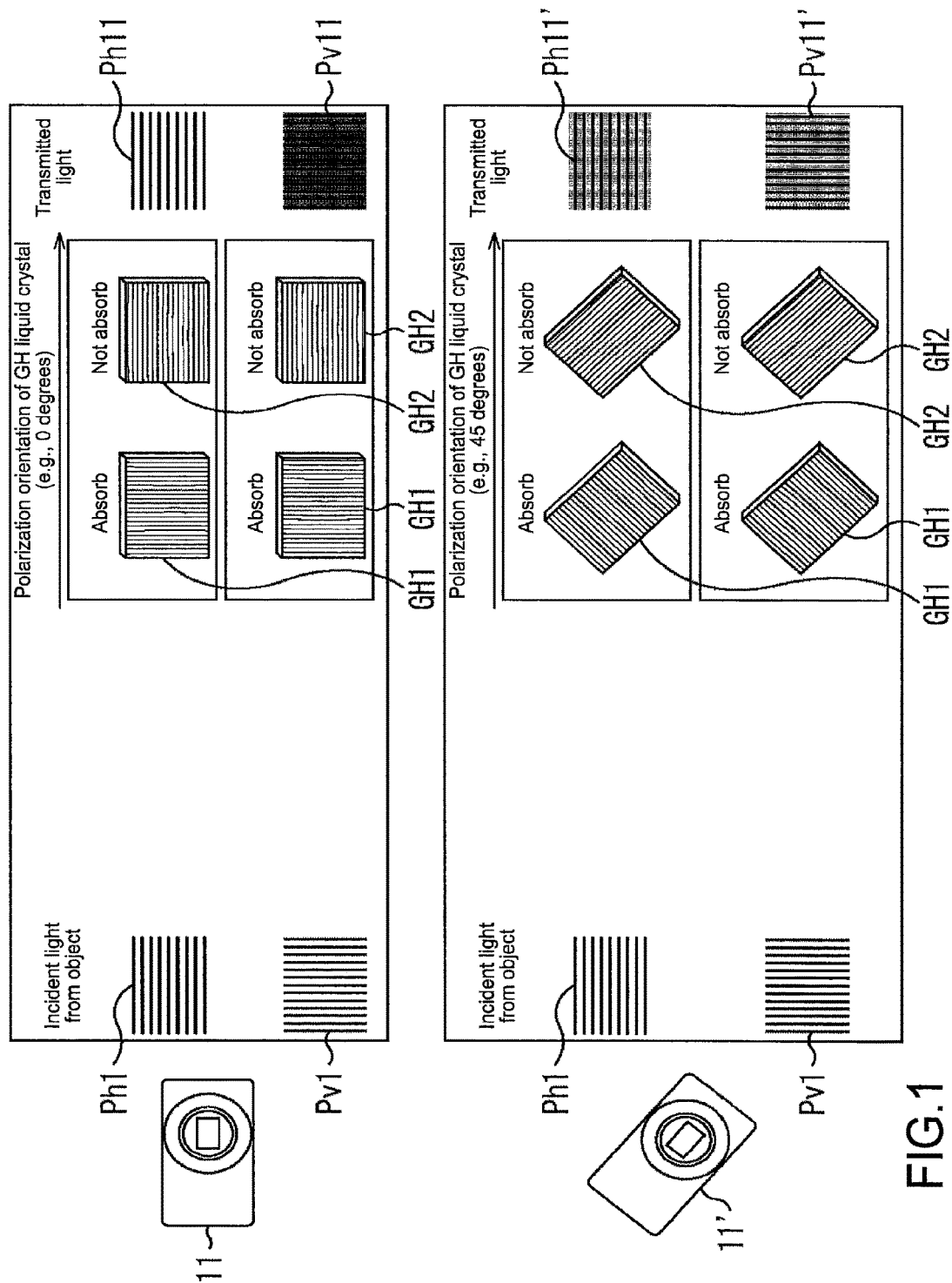
FIG. 1 is a diagram illustrating an operation of extracting a polarization component by an image pickup apparatus in the past when a camera orientation is changed.
Figure 2:
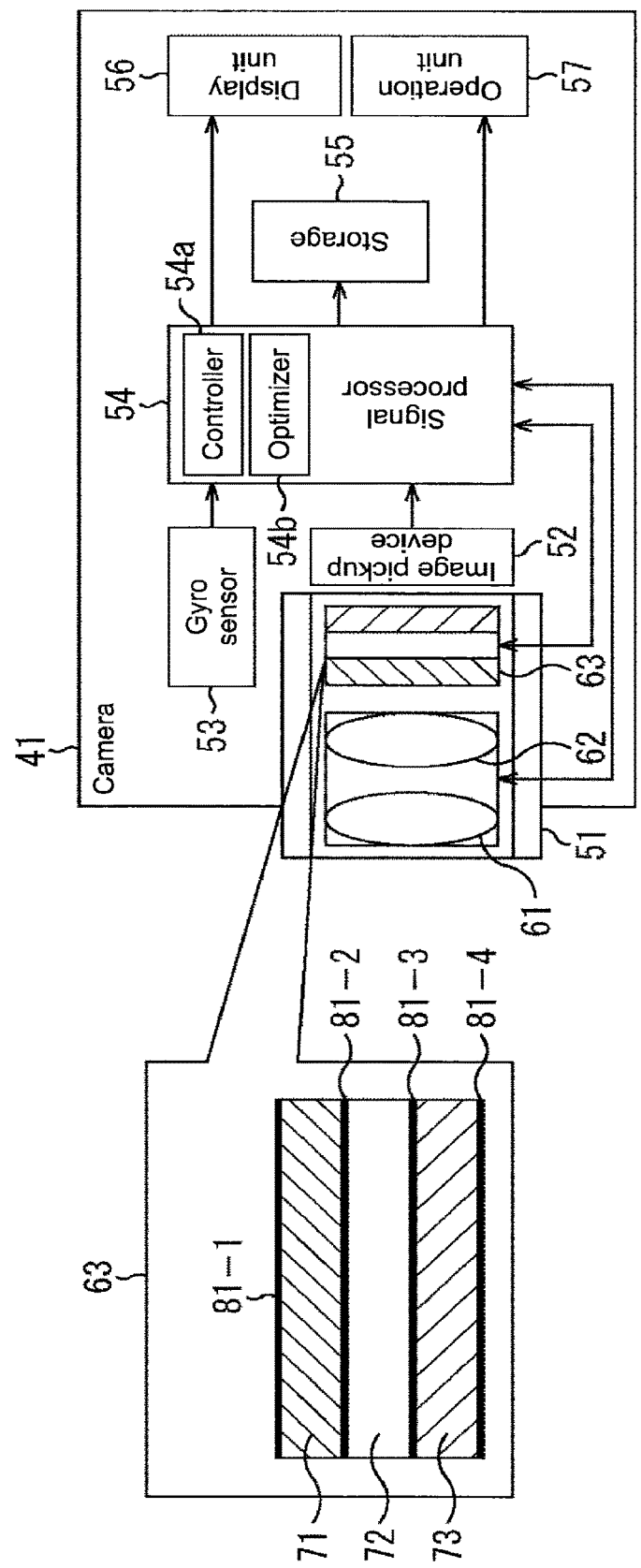
FIG. 2 is a diagram showing an example of the configuration of a camera of the present technology.

FIG. 2 shows an example of the structure of a camera of the present technology. The camera 41 of FIG. 2 is configured to detect an image-pickup posture (camera orientation) of a main body, to rotate a polarization axis of a polarization component based on the detected image-pickup posture (camera orientation), to appropriately detect light having a polarization component to be detected, and to take an image including light having the appropriately-detected polarization component.

The camera 41 includes the optical-system block 51, the image pickup device 52, the gyro sensor 53, the signal processor 54, the storage 55, the display unit 56, and the operation unit 57.

The optical-system block 51 includes the image pickup lenses 61 and 62, and the polarization control device 63. The image pickup lenses 61 and 62 are optical lenses. The image pickup lenses 61 and 62 adjust the focal position of an object. An incident light passes through the image pickup lenses 61 and 62, and reaches the polarization control device 63. Note that, in the example of FIG. 2, the two image pickup lenses 61 and 62 are provided. Alternatively, one image pickup lens or three or more image pickup lenses may be provided. Further, in the example of FIG. 2, the image pickup lenses 61 and 62 are convex lenses. Alternatively, other lenses may be used together. For example, image pickup lenses may include a concave lens.

The polarization control device 63 includes the TN (Twisted Nematic) liquid crystal layer 71, and the GH (Guest-Host) liquid crystal layers 72 and 73. The polarization control device 63 is provided in front of the image pickup device 52. Further, in the polarization control device 63, the ITO (Indium Tin Oxide) electrode layer 81-1 is provided on the TN (Twisted Nematic) liquid crystal layer 71. The ITO (Indium Tin Oxide) electrode layer 81-2 is provided between the TN (Twisted Nematic) liquid crystal layer 71 and the GH liquid crystal layer 72. The ITO (Indium Tin Oxide) electrode layer 81-3 is provided between the GH liquid crystal layer 72 and the GH liquid crystal layer 73. The ITO (Indium Tin Oxide) electrode layer 81-4 is provided on the GH liquid crystal layer 73. The ITO (Indium Tin Oxide) electrode layers 81-1 and 81-2 control the operation of the layer 71. The ITO (Indium Tin Oxide) electrode layers 81-2 and 81-3 control the operation of the layer 72. The ITO (Indium Tin Oxide) electrode layers 81-3 and 81-4 control the operation of the layer 73.

Depending on the voltage applied between the ITO electrode layers 81-1 and 81-2, the orientation of the molecules of the twisted nematic liquid crystal of the TN liquid crystal layer 71 is rotated about 90 to 270 degrees of the twist angle. The polarization orientation of the entire incident light is rotated depending on the rotation amount of the liquid crystal molecules. The TN liquid crystal layer 71 is used for a liquid crystal display apparatus or the like. In this case, polarizers are formed on the both sides of the TN liquid crystal layer 71. The TN liquid crystal layer 71 is sandwiched between the polarizers and is used. However, in this embodiment, the TN liquid crystal layer 71 is used alone.

The GH liquid crystal layer 72 includes liquid crystal molecules (host) and dichroism dye molecules (guest) solved in the liquid crystal molecules (host). The GH liquid crystal layer 72 is characterized in that the guest is oriented along the host. Because of this, if a voltage is not applied to the liquid crystal, the liquid crystal molecules (host) are oriented in a plane with respect to an incident light, and the dye molecules (guest) absorb the polarization component in parallel with the liquid crystal molecules. If a voltage is applied to the liquid crystal, the liquid crystal molecules are oriented perpendicularly in the plane, and the dye molecules (guest) transmit the polarization component.

Figure 3:
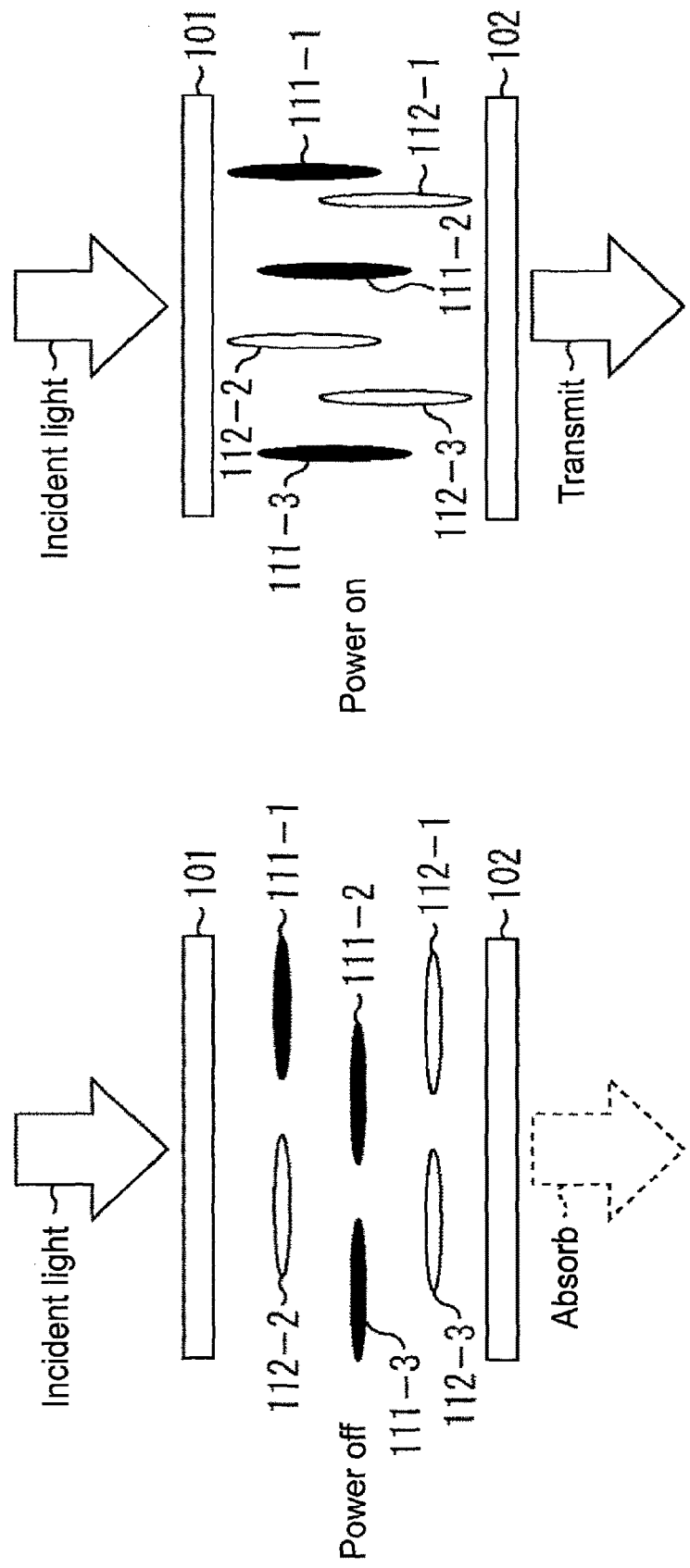
FIG. 3 is a diagram illustrating an example of the structure of a polarization control device in detail.

More specifically, as shown in the left part of FIG. 3, the electrodes 101 and 102 controls the liquid crystal molecules. If a voltage is not applied between the electrodes 101 and 102, the liquid crystal molecules 112-1 to 112-3 are held in the horizontal direction. The dye molecules 111-1 to 111-3 are held in the same direction. Because of this, the GH liquid crystal layer 72 absorbs the polarization component, and the polarization component does not pass through the GH liquid crystal layer 72. Meanwhile, as shown in the right part of FIG. 3, the electrodes 101 and 102 control the liquid crystal molecules. If a voltage is applied between the electrodes 101 and 102, the liquid crystal molecules 112-1 to 112-3 are held in the perpendicular direction. The dye molecules 111-1 to 111-3 are held in the same direction. Because of this, the polarization component passes through the GH liquid crystal layer 72. Note that, here, "dichroism" means the characteristics in which the dye absorbs/does not absorb light depending on the traveling direction and the polarization direction of the light.

The image pickup device 52 is a CCD (Charge Coupled Device) or a CMOS (Complementary Metal-Oxide Semiconductor). Light passes through the optical-system block 51. The image pickup device 52 photoelectrically converts the light into an electric signal. The image pickup device 52 supplies the electric signal, as an image signal, to the signal processor 54.

The gyro sensor 53 detects the angular speed. The angular speed is used to determine the camera orientation, i.e., the orientation of the main body of the camera 41. The gyro sensor 53 supplies the angular speed to the signal processor 54.

The signal processor 54 includes the controller 54a and the optimizer 54b. When a keyboard and operation buttons are operated, the operation unit 57 supplies operation signals to the signal processor 54. The signal processor 54 controls the entire behavior of the camera 41 based on the operation signals. Further, the image pickup device 52 supplies image signals to the signal processor 54. The signal processor 54 stores the image signals in the storage 55. The storage 55 includes a HDD (Hard Disc Drive), a SSD (Solid State Drive), and the like. Further, the signal processor 54 displays the image signals supplied from the image pickup device 52 on the display unit 56. The display unit 56 includes a LCD (Liquid Crystal Display) and the like.

The gyro sensor 53 supplies information on the angular speed of the main body of the camera 41 to the controller 54a. The controller 54a calculates the present posture of the camera 41 based on the supplied information. The controller 54a determines the image-pickup posture (camera orientation), i.e., the direction and posture of the camera. Further, the controller 54a adjusts the twist angle in the polarization direction of the TN liquid crystal layer 71 of the optical-system block 51 based on the information on the determined image-pickup posture (camera orientation) of the camera 41. As a result, the controller 54a controls the polarization orientation of an object (objective world), whose image is to be taken, such that it is always the same as the orientation of the GH liquid crystal layers 72 and 73, and takes an image.

The optimizer 54b performs various kinds of processing on image signals supplied from the image pickup device 52. The various kinds of processing include various kinds of subtraction processing such as foreground or background, enhancement processing such as edge enhancement, and correction processing such as color correction.

Polarization-Component Detection Processing

Figure 4:
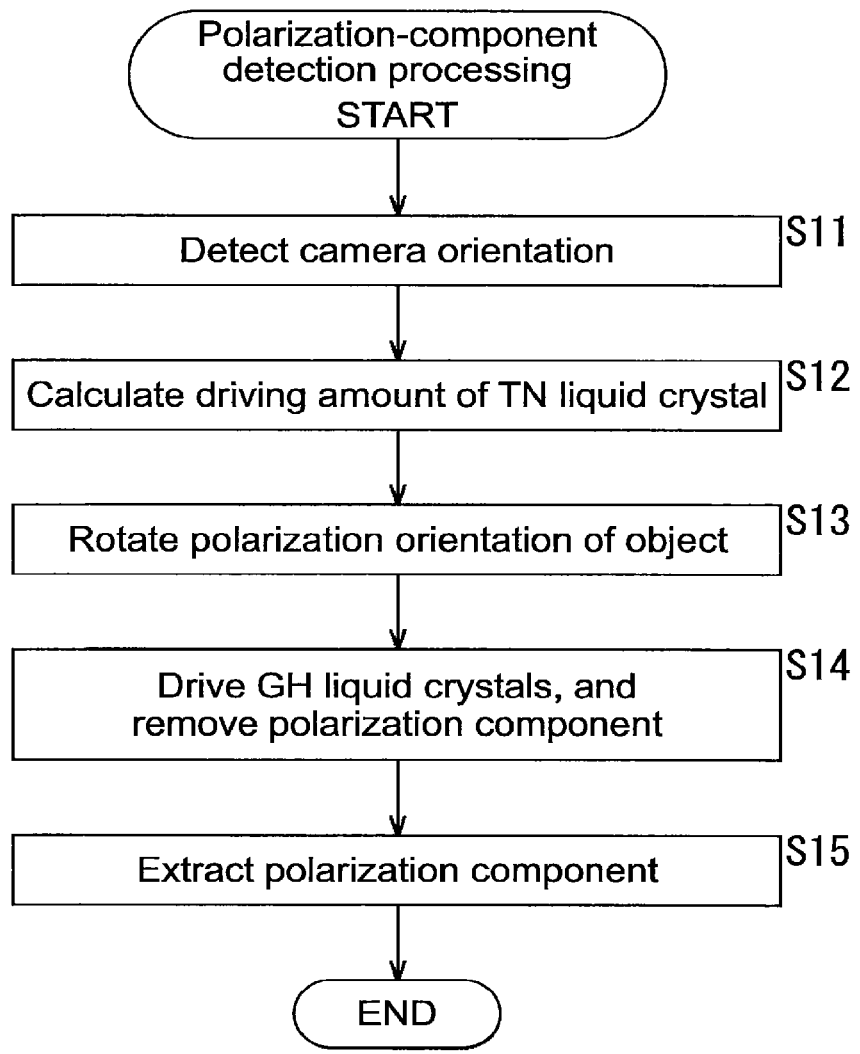
FIG. 4 is a flowchart illustrating polarization-component extraction processing performed by the camera of FIG. 2.

Next, with reference to the flowchart of FIG. 4, polarization-component detection processing will be described. The camera 41 of FIG. 2 performs the polarization-component detection processing.

For example, a user operates the operation unit 57, and an instruction to take an image is input. Then the camera 41 starts the processing. In Step S11, in response to the instruction, the gyro sensor 53 detects an angular speed. The angular speed is used to determine the camera orientation. The camera orientation is the image-pickup posture of the main body of the camera 41. The gyro sensor 53 supplies the angular speed to the signal processor 54. The controller 54a of the signal processor 54 determines the camera orientation based on the information on the angular speed.

In Step S12, the controller 54a calculates, based on the information on the determined camera orientation, the angle of torsionally rotating the polarization orientation such that the polarization orientation of the polarization component of the TN liquid crystal layer 71 corresponds to the polarization orientation in a case where the camera orientation is horizontal. The controller 54a calculates a driving amount corresponding to the angle.

In Step S13, the controller 54a applies a voltage, which is required to drive the TN liquid crystal layer 71 by the calculated driving amount, between the ITO electrode layers 81-1 and 81-2. As the result of the processing, the TN liquid crystal layer 71 torsionally rotates the polarization orientation of the polarization component by the angle corresponding to the camera orientation detected by the gyro sensor 53. Light passes through the TN liquid crystal layer 71, and enters the GH liquid crystal layers 72 and 73.

In Step S14, the controller 54a applies a predetermined voltage to the ITO electrode layers 81-2 to 81-4 to thereby turn on/off each of the GH liquid crystal layers 72 and 73. The light passes through the TN liquid crystal layer 71, whereby the polarization orientation of the polarization component of the light is rotated. The GH liquid crystal layer 72 transmits or absorbs light having one polarization orientation out of the light whose polarization component is rotated. The GH liquid crystal layer 73 transmits or absorbs light having another polarization orientation out of the light whose polarization component is rotated.

In Step S15, the image pickup device 52 receives and detects the light, which passes through the GH liquid crystal layers 72 and 73. In addition, the image pickup device 52 photoelectrically converts the detected light into an electric signal. As a result, the image pickup device 52 generates an image signal as a whole. The image pickup device 52 outputs the image signal to the signal processor 54. The controller 54a of the signal processor 54 displays the image signal supplied from the image pickup device 52 on the display unit 56. Alternatively, the controller 54a stores the image signal supplied from the image pickup device 52 in the storage 55. At this time, the optimizer 54b arbitrarily processes the image signal as necessary.

Figure 5:
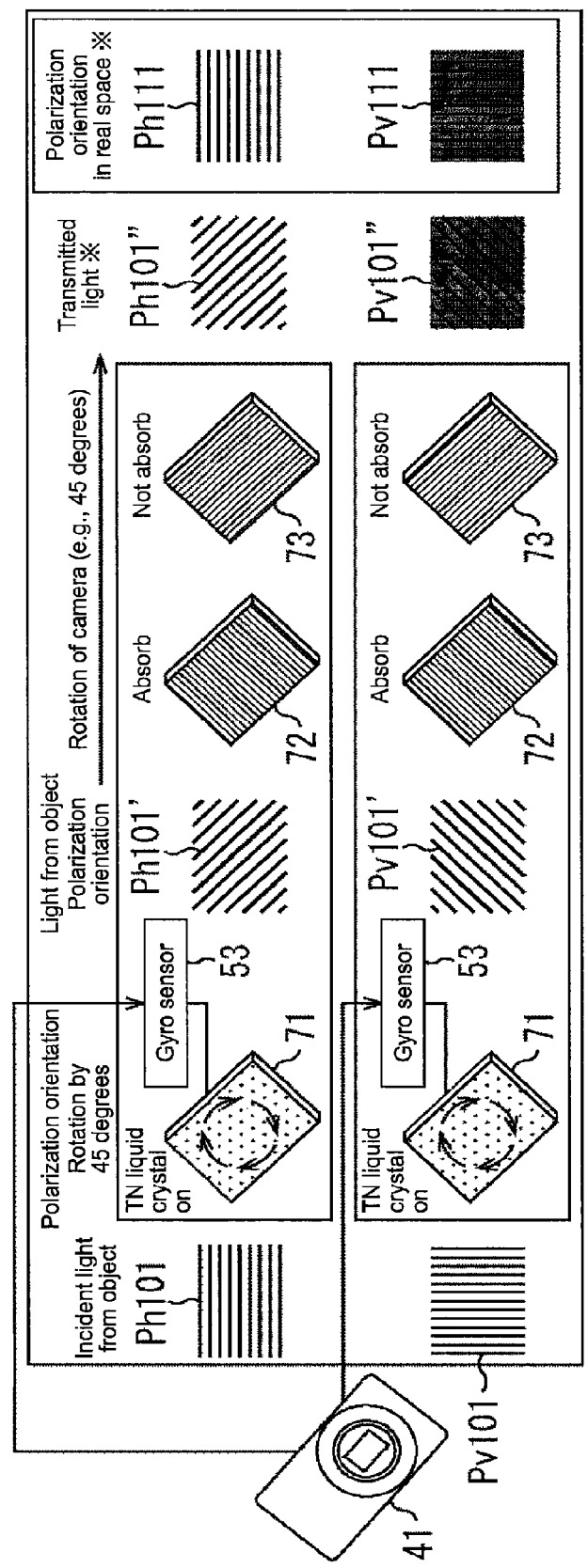
FIG. 5 is a diagram illustrating the polarization-component extraction processing performed by the camera of FIG. 2.

That is, to summarize the above-mentioned processing, as shown in FIG. 5, in the processing of Step S11, the gyro sensor 53 detects the angular speed. The angular speed is used to determine the camera orientation of the camera 41. The gyro sensor 53 supplies the angular speed to the signal processor 54. For example, the camera 41 is inclined at 45 degrees to the horizontal direction. In this case, the gyro sensor 53 supplies the angular speed corresponding to 45 degrees to the signal processor 54 as a detection result.

Then, in the processing of Step S12, the controller 54a of the signal processor 54 determines the camera orientation. The controller 54a determines the angle of rotating the polarization direction of the polarization component by the angle corresponding to the camera orientation. The controller 54a determines the driving amount of the TN liquid crystal layer 71 corresponding to the angle. That is, if the camera 41 is inclined at 45 degrees, the controller 54a determines, based on the detection result of the gyro sensor 53, the driving amount of rotating the polarization direction of the polarization component by 45 degrees. This driving amount is the driving amount of the TN liquid crystal layer 71.

In the processing of Step S13, the controller 54a applies a voltage, which is required to drive the TN liquid crystal layer 71 by the determined driving amount, between the ITO electrode layers 81-1 and 81-2. In the processing of Step S13, as shown in FIG. 5, the polarization direction of the image Ph101 is the horizontal direction. The image Ph101 passes through the TN liquid crystal layer 71. As a result, the polarization direction of the image Ph101 is rotated by 45 degrees, whereby the image Ph101' is obtained. The image Ph101' enters the GH liquid crystal layers 72 and 73. Similarly, as shown in FIG. 5, the polarization direction of the image Pv101 is the perpendicular direction. The image Pv101 passes through the TN liquid crystal layer 71. As a result, the polarization direction of the image Pv101 is rotated by 45 degrees, whereby the image Pv101' is obtained. The image Pv101' enters the GH liquid crystal layers 72 and 73.

For example, the GH liquid crystal layer 72 transmits or absorbs the polarization component having the perpendicular polarization direction. The GH liquid crystal 73 transmits or absorbs the polarization component having the horizontal polarization direction. Light having the polarization component, whose polarization direction is the horizontal direction, is to be transmitted. In this case, the processing of Step S14 includes the following processing. That is, the controller 54a applies no voltage between the ITO electrode layer 81-2 and 81-3 to thereby apply no voltage to the GH liquid crystal layer 72. As a result, the GH liquid crystal layer 72 absorbs the perpendicular polarization component. In addition, the controller 54a applies a voltage between the ITO electrode layers 81-3 and 81-4 to thereby apply a voltage to the GH liquid crystal 73. As a result, the horizontal polarization component passes through the GH liquid crystal 73.

The above-mentioned processing will be described in detail. The polarization direction of the image Ph101 is rotated by 45 degrees, whereby the image Ph101' is obtained. The polarization component of the image Ph101' is rotated such that the polarization direction corresponds to the camera direction. The GH liquid crystal layer 72 transmits or absorbs the polarization component having the perpendicular polarization direction. Even if the GH liquid crystal layer 72 is turned off (i.e., absorbs light), the image Ph101' passes through the GH liquid crystal layer 72 because the controlled polarization direction is perpendicular to the GH liquid crystal layer 72. Further, the polarization component of the image Ph101' is rotated such that the polarization direction corresponds to the camera direction. The GH liquid crystal layer 73 transmits or absorbs the polarization component having the horizontal polarization direction. If the GH liquid crystal layer 73 is turned on (i.e., does not absorb light), then the image Ph101' passes through the GH liquid crystal layer 73. As a result, the GH liquid crystal layers 72 and 73 does not absorb the image Ph101', and the image Ph101" passes through the GH liquid crystal layers 72 and 73.

Meanwhile, the polarization direction of the image Pv101 is rotated by 45 degrees, whereby the image Pv101' is obtained. The polarization component of the image Pv101' is rotated such that the polarization direction corresponds to the camera direction. The GH liquid crystal layer 72 transmits or absorbs the polarization component having the perpendicular polarization direction. Because the GH liquid crystal layer 72 is turned off (i.e., absorbs light), the GH liquid crystal layer 72 absorbs almost all the image Pv101'. Further, the polarization component of the image Pv101' is rotated such that the polarization direction corresponds to the camera direction. The GH liquid crystal layer 73 transmits or absorbs the polarization component having the horizontal polarization direction. If the GH liquid crystal layer 73 is turned on (i.e., does not absorb light), then the image Pv101' passes through the GH liquid crystal layer 73. Even if the GH liquid crystal layer 73 is turned off (i.e., absorbs light), the image Pv101' passes through the GH liquid crystal layer 73 because the controlled polarization direction is perpendicular to the GH liquid crystal layer 73. As a result, the GH liquid crystal 72 absorbs the image Pv101', and the almost-black image Pv101" thus passes through the GH liquid crystal layer 73.

As described above, in the processing of Step S15, the image pickup device 52 receives the synthesized image of the images Ph101" and Pv101". The image pickup device 52 detects the corresponding image signal. Note that, in the example of FIG. 5, as described above, the image Pv101" is an almost black image. As a result, actually, the image pickup device 52 detects the image signal having the desired polarization component as shown in the image Ph101".

In this case, the polarization direction of each of the images Ph101" and Pv101" is rotated by 45 degrees in the direction in which the camera 41 is inclined. Because of this, the polarization direction of each taken image in the real space is corrected in the horizontal direction and the perpendicular direction. As a result, the images Ph111 and Pv111 of FIG. 5 are extracted. The polarization direction of the extracted images Ph111 and Pv111 is the polarization direction of the real space. Note that each of the images Ph111 and Pv111 illustrated in FIG. 5 merely shows the polarization direction represented by the black and white stripes.

Figure 6:
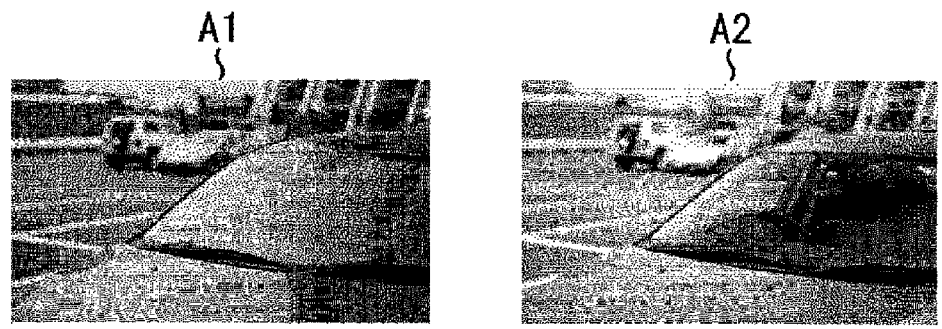
FIG. 6 is a diagram illustrating an image taken in the polarization-component extraction processing performed by the camera of FIG. 2.

An image is taken, and an image signal is stored. The image signal includes information on the polarization component. For example, as shown in the left part of FIG. 6, an image of a window glass is taken outdoors. In general, the window glass reflects light of the sky and the like. The image includes such a reflection component. As a result, it is difficult to see the room interior in the image. However, the right part of FIG. 6 shows a taken image only having the P-polarization component (image from which S-polarization is removed). The reflection component at the surface of the window glass is removed from the image. Because of this, it is possible to obtain information, which may not be obtained in an image taken by means of a general image pickup method. For example, the following technology employing the similar phenomenon is generally known. A pair of polarized sunglasses is used to watch the surface of water. Then the surface reflectance component at the surface of water is removed. Visualization of objects under the water is improved.

Figure 7:
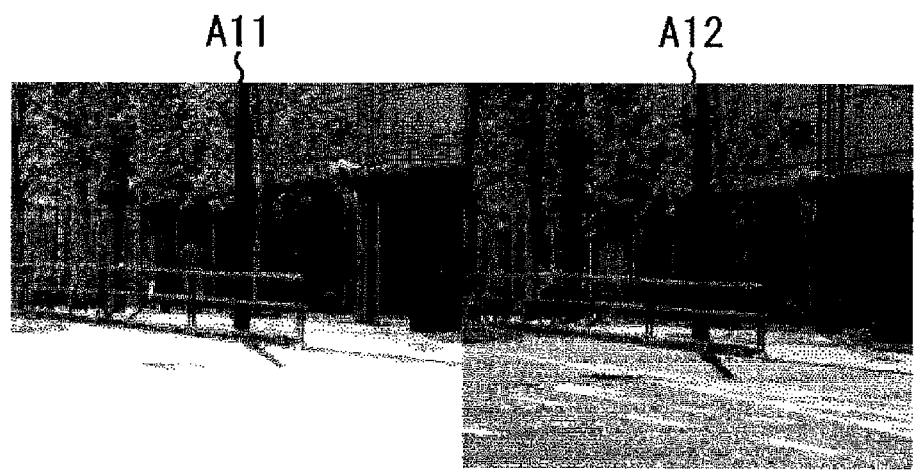
FIG. 7 is a diagram illustrating an image taken in the polarization-component extraction processing performed by the camera of FIG. 2.

Further, as shown in the left part of FIG. 7, on a clear and bright day, signs (white line, hazard sign, speed sign, or the like) on a road surface may have blown-out highlights because of the surface reflectance component. The same applies to a wet road surface on a rainy day. The surface reflectance component is polarization-dependent. The camera 41 of FIG. 2 takes an image of a road surface such that the polarization component being the surface reflectance component is removed. As a result, as shown in the right part of FIG. 7, it is possible to appropriately take an image of signs (white line, hazard sign, speed sign, or the like) on a road surface.

According to the above-mentioned processing, even if the camera 41 is inclined when taking an image, the polarization direction is rotated corresponding to the camera direction, i.e., the direction in which the camera 41 is inclined. As a result, it is possible to take an image having a polarization component appropriate to the polarization direction of the real space.

Further, if an area in an image has blown-out highlights as described above, the following technology is generally employed in related art. That is, brightness is decreased sufficiently such that the reflected area, which has blown-out highlights, is recognized, and exposure is adjusted. However, if the brightness level is decreased and the exposure is adjusted, a dark area in the area other than the area having blown-out highlights may have blocked-up shadows. The HDR (high dynamic range) method employs the above-mentioned common technology. According to the HDR method, a plurality of images are taken. The exposure levels of the plurality of images are different from each other between the exposure level corresponding to a bright area and the exposure level corresponding to a dark area such that the dark area has no blocked-up shadows. After the plurality of images are taken, the plurality of images are synthesized by means of signal processing. As a result, the entire area of the obtained image including the darkest area and the brightest area is recognized.

This method is used as follows. A camera including a solid-state image pickup device such as a CCD or a CMOS takes an image. All of the sunny sky, the shadow of a building, and the like are in the angle of view of the taken image. In this case, there is a large brightness difference between the darkest area and the brightest area of the real objects. In this case, the obtained dynamic range is not enough because of the sensitivity of the image pickup device 52 and the saturated signal amount. If exposure is adjusted based on a bright area, a dark area has blocked-up shadows. If exposure is adjusted based on a dark area, a bright area has blown-out highlights. In view of this, a plurality of images are obtained. The exposure levels of the plurality of images are different from each other. If an area may have blocked-up shadows, the exposure level of the area is adjusted such that the area will not have blocked-up shadows. If an area may have blown-out highlights, the exposure level of the area is adjusted such that the area will not have blown-out highlights. The plurality of images are synthesized. As a result, the entire area of the obtained image including the darkest area and the brightest area is recognized.

However, it is necessary to synthesize a plurality of images. The synthesized images are taken at different time points. As a result, the synthesized image may be blurred, and the image quality may be lowered. Further, when a moving image is taken, it is necessary to process the moving image in real time. Because of this, it is necessary to take images at a frame rate at least more than double, and to synthesize the images. The processing configuration itself is complicated, and the image quality may be lowered.

To the contrary, according to the present technology, only one polarization component is picked up. As a result, it is possible to obtain the following image. That is, the component reflected at the surface of an object is removed from an obtained image. Further, according to the method of controlling the brightness level of exposure, some brightness information is not removed sufficiently. To the contrary, according to the present technology, the polarization component is controlled. As a result, brightness information is removed and obtained. It is thus possible to obtain brightness information, which is not obtained per se.

In view of the above, both the HDR method in the past and the present technology are used. For example, the camera 41 has the function of the optimizer 54b. As a result, it is possible to obtain brightness information of objects, which is not obtained in the HDR method in the past.

Second Embodiment

Figure 8:
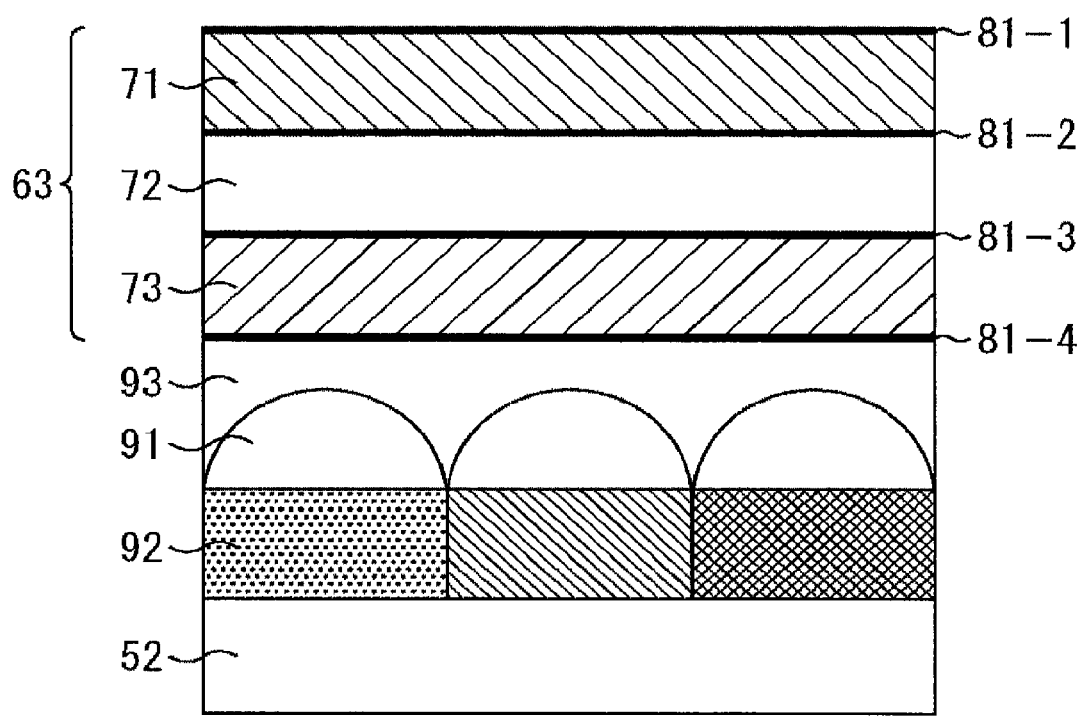
FIG. 8 is a diagram illustrating an example of a structure integrally including on-chip lenses and the polarization control device.

In the example of the above-mentioned first embodiment, the polarization control device 63 is provided in front of the image pickup device 52. Alternatively, for example, the polarization control device 63 may include on-chip lenses and color filters integrally. That is, as shown in FIG. 8, the polarization control device 63 further includes the on-chip lenses 91 and the color filters 92. The polarization control device 63 has an all-in-one structure including them.

More specifically, as shown in FIG. 8, the on-chip lens 91 and the color filter 92 are provided for each pixel between the image pickup device 52 and the polarization control device 63. If the refractive index n1 of the on-chip lenses 91 is smaller than the refractive index n2 of the space (transparent layer) 93 between the on-chip lenses 91 and the polarization control device 63 (i.e., n1<n2), then the on-chip lenses 91 are convex lenses as shown in FIG. 8. Meanwhile, if the refractive index n1 of the on-chip lenses 91 is larger than the refractive index n2 (i.e., n1>n2), then the on-chip lenses 91 are concave lenses (not shown).

Third Embodiment

Figure 9:
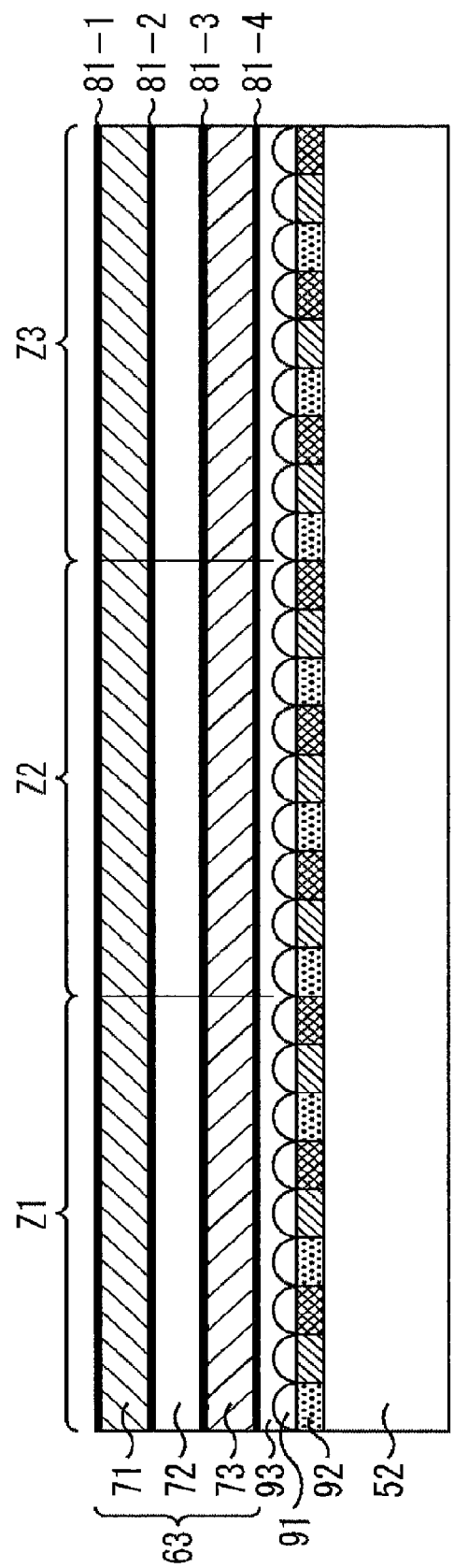
FIG. 9 is a diagram illustrating an example of a structure in which the polarization control device is divided into a plurality of area units each including a plurality of pixels of an image pickup device.

In the above-mentioned second embodiment, the TN liquid crystal layer 71, the GH liquid crystal layers 72 and 73, the on-chip lenses 91, and the color filters 92 are provided on the entire area of the image pickup device 52. The TN liquid crystal layer 71 is controlled in one polarization direction. Alternatively, for example, as shown in FIG. 9, the image pickup device 52 may be divided into a plurality of zones Z1 to Z3 (or may be divided into three or more zones). The GH liquid crystal layer 72 may be turned on/off and the GH liquid crystal layer 73 may be turned on/off independently for each zone. That is, in this case, a plurality of sets of the ITO electrode layers 81-1 to 81-4 are provided in a matrix form. A set of the ITO electrode layers 81-1 to 81-4 corresponds to each of the zones Z1 to Z3. With this structure, the zones Z1 to Z3 are controlled independently. The rotation angle of the polarization direction of the TN liquid crystal layer 71 may be adjusted for each zone. In addition, the GH liquid crystal layer 72 may be turned on/off and the GH liquid crystal layer 73 may be turned on/off independently for each zone.

According to the structure of FIG. 9, when an image is taken, the controller 54a of the signal processor 54 obtains brightness information (i.e., detection result) from the image pickup device 52. The controller 54a extracts a predetermined polarization component from an area high in brightness. At the same time, the controller 54a does not extract a predetermined polarization component from an area low in brightness. According to this processing, a predetermined polarization component is extracted from an area, which may have blown-out highlights. Examples of such an area include an area including a windshield in a taken image of the left part of FIG. 6 and an area including a roadway in an image of the left part of FIG. 7. An image of the other area is taken under the normal condition. As a result, it is possible to prevent a dark area, which needs no processing, from being processed excessively. It is possible to prevent the amount of brightness signals from being reduced unnecessarily. That is, it is possible to prevent blocked-up shadows from occurring. At the same time, it is possible to take an image including necessary information.

Fourth Embodiment

Figure 10:
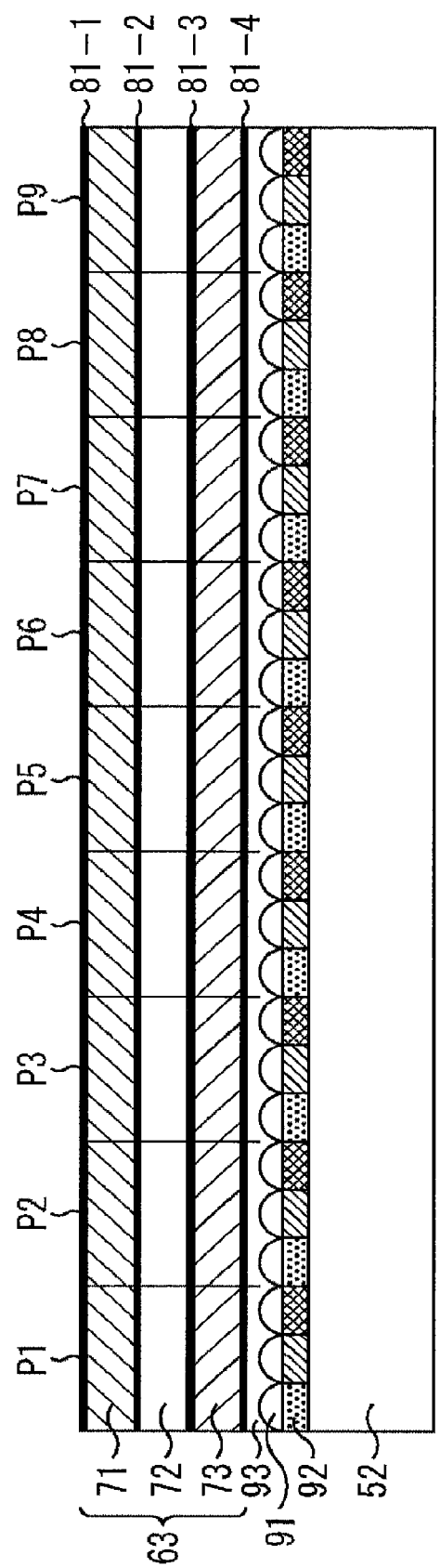
FIG. 10 is a diagram illustrating an example of a structure in which the polarization control device is divided into sets of RGB pixels of the image pickup device.

In the above-mentioned example of FIG. 9, the image pickup device 52 is divided into the plurality of zones Z1 to Z3. Each of the zones Z1 to Z3 has a plurality of pixels. Each zone only extracts a predetermined polarization component. Further, as shown in FIG. 10, only a predetermined polarization component may be extracted from each of the pixel units P1 to P9 (or ten or more pixel units, or eight or less pixel units). Note that a pixel unit includes a set of RGB. In this case, a plurality of sets of the ITO electrode layers 81-1 to 81-4 are provided in a matrix form. A set of the ITO electrode layers 81-1 to 81-4 corresponds to each of the RGB pixel units P1 to P9. As a result, each RGB pixel unit is controlled independently. With this structure, the rotation angle of the polarization direction of the TN liquid crystal layer 71 may be adjusted for each RGB pixel unit. In addition, the GH liquid crystal layer 72 may be turned on/off and the GH liquid crystal layer 73 may be turned on/off independently for each RGB pixel unit.

With this structure, it is possible to prevent blown-out highlights and blocked-up shadows from occurring with a higher degree of accuracy. At the same time, it is possible to take an image including necessary information. Note that if the size of a pixel is too small in view of the thickness of the polarization control device 63, then the accuracy of detecting an oblique-incident light may be decreased. In view of this, if the pixel size is increased or the thickness of the polarization control device 63 is reduced, then it is possible to prevent the detection accuracy from being decreased.

Fifth Embodiment

Figure 11:
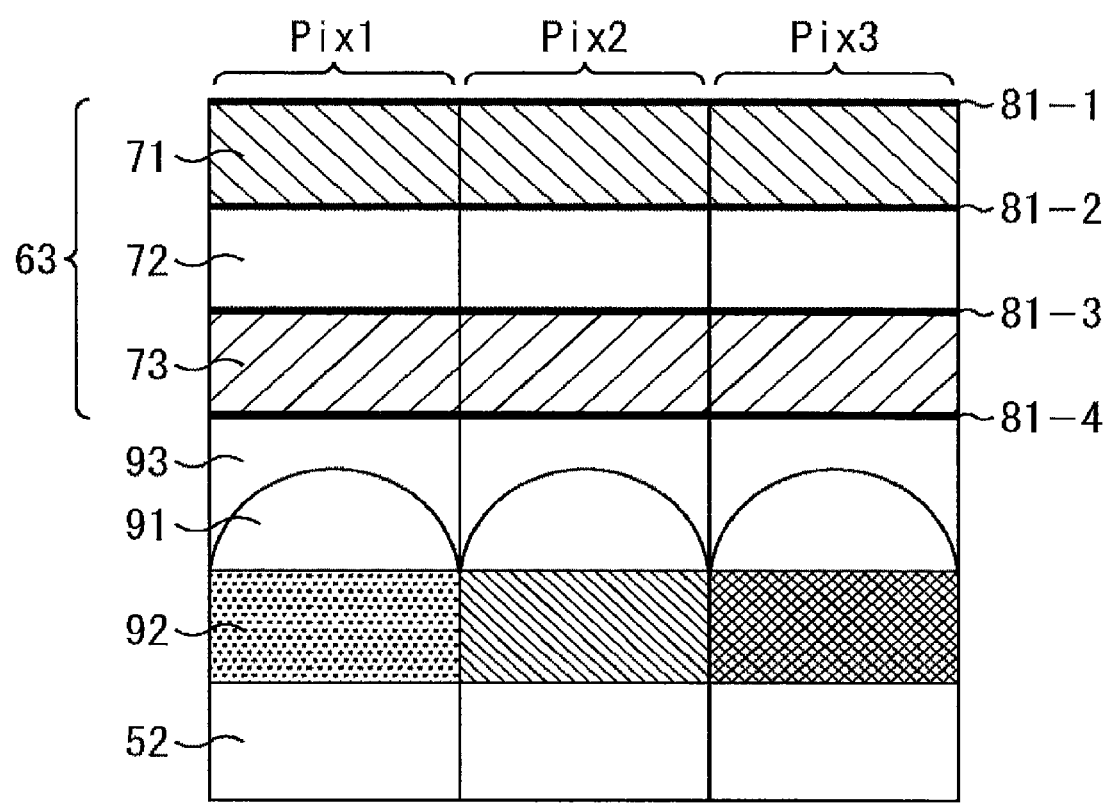
FIG. 11 is a diagram illustrating an example of a structure in which the polarization control device is divided into pixels of the image pickup device.

In the above-mentioned example, it is possible to adjust the rotation angle of the TN liquid crystal layer 71 in the polarization direction for each of the pixel units P1 to P9, i.e., each RGB pixel unit. For example, as shown in FIG. 11, a polarization component may be extracted for each totally-independent pixel. That is, in the case of FIG. 11, a plurality of sets of the ITO electrode layers 81-1 to 81-4 are provided in a matrix form. A set of the ITO electrode layers 81-1 to 81-4 corresponds to each of the pixels Pix1 to Pix3. With this structure, the rotation angle of the polarization direction of the TN liquid crystal layer 71 may be adjusted for each pixel. In addition, the GH liquid crystal layer 72 may be turned on/off and the GH liquid crystal layer 73 may be turned on/off independently for each pixel.

With this structure, it is possible to prevent blown-out highlights and blocked-up shadows from occurring with a much higher degree of accuracy. At the same time, it is possible to take an image including necessary information.

Sixth Embodiment

In the above-mentioned example, the rotate of the polarization direction is adjusted for each pixel. An unprecedented image may be taken by applying this technology.

Figure 12:
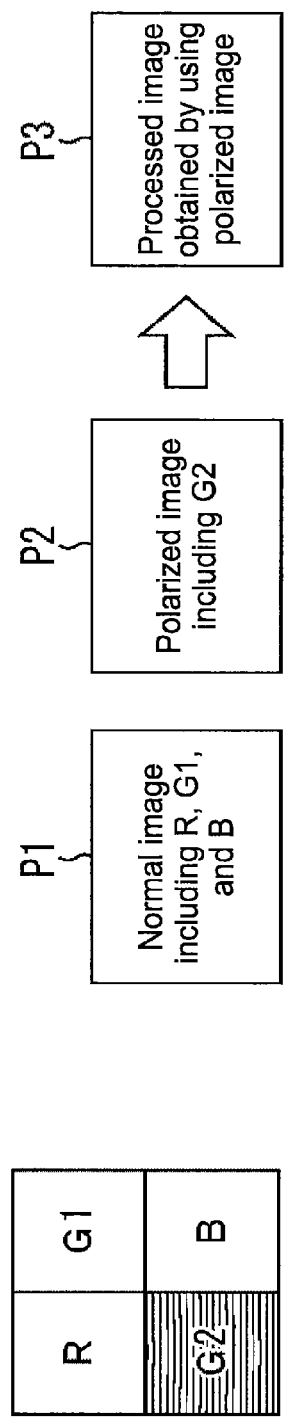
FIG. 12 is a diagram illustrating an example of generating a processed image having no blown-out highlights and no blocked-up shadows based on a polarized image only including second green pixels, which are subjected to horizontal-polarization processing, and based on a normal image including the other pixels.

That is, as shown in the left part of FIG. 12, the red pixel R, the green pixels G1 and G2, and the blue pixel B are arrayed checkerwise. In this case, the controller 54a performs horizontal-polarization processing only on the green pixels G2. An image including the red pixels R, the first green pixels G1, and the blue pixels B is taken under the normal condition. As a result, as shown in the center part of FIG. 12, the normal image P1 and the polarized image P2 are taken. The normal image P1 including the red pixels R, the first green pixels G1, and the blue pixels B is taken under the normal condition. The polarized image P2 including the green pixels G2, which is subjected to the horizontal-polarization processing, is taken.

In this case, the optimizer 54b compares the activity of each pixel of the normal image P1 with the activity of the corresponding pixel of the polarized image P2. The optimizer 54b generates the processed image P3. The processed image P3 includes the pixels each having higher activity. Here, the definition of the "pixel having a higher activity" is as follows. That is, the difference between the pixel value of a certain pixel and the pixel value of an adjacent pixel is large. Alternatively, the sum of the absolute difference of the adjacent pixels in the area around a certain pixel is large. The thus generated processed image P3 includes a lot of necessary information in the image. Areas low in activity (e.g., blown-out highlights and blocked-up shadows) are removed from the processed image P3 substantially. Further, the normal image P1 and the polarized image P2 are taken simultaneously. As a result, the processed image P3 is not blurred. As a result, the pixels, which are used to increase the resolution normally, are used effectively. It is possible to take an unprecedented image while the resolution is not decreased and the brightness signal is corrected appropriately.

Seventh Embodiment

Figure 13:
FIG. 13 is a diagram illustrating an example of generating a processed image having no blown-out highlights and no blocked-up shadows based on a polarized image only including white pixels, which are subjected to horizontal-polarization processing, and based on a normal image including the other pixels.

In the above-mentioned example, the first and second green pixels, the red pixel, and the blue pixel are arrayed checkerwise (2 pixels.times.2 pixels). The polarized image P2 is taken by only using the green pixels G2, which are subjected to the horizontal-polarization processing. At the same time, the normal image P1 including the pixels other than the green pixels G2, i.e., the red pixels R, the green pixels G1, and the blue pixels B, is taken under the normal condition. The processed image P3 is generated. The processed image P3 includes the pixels each having higher activity. However, a color combination other than the above-mentioned combination of green, red, and blue pixels may be employed. The similar effect may be obtained if pixels, whose color has an effect on brightness, are subjected to the polarization control. That is, for example, as shown in the left part of FIG. 13, a white pixel is arrayed instead of the second green pixel. The polarized image P2' is taken while the polarization of the white pixels is controlled. At the same time, the normal image P1' including the red pixels, the blue pixels, and the green pixels is taken. The processed image P3' is obtained based on the polarized image P2' and the normal image P1'. As a result, the similar effect may be obtained.

That is, the controller 54a performs the horizontal-polarization processing only on the white pixels W. An image including the red pixels R, the green pixels G, and the blue pixels B is taken under the normal condition. As shown in the center part of FIG. 13, the normal image P1' and the polarized image P2' are thus taken. The normal image P1' including the red pixels R, the green pixels G, and the blue pixels B is taken under the normal condition. The polarized image P2' including the white pixels W, which are subjected to the horizontal-polarization processing, is taken.

In this case, the optimizer 54b compares the activity of each pixel of the normal image P1' with the activity of the corresponding pixel of the polarized image P2'. The optimizer 54b generates the processed image P3'. The processed image P3' includes the pixels each having higher activity. The thus generated processed image P3' includes a lot of necessary information in the image. Areas low in activity (e.g., blown-out highlights and blocked-up shadows) are removed from the processed image P3' substantially. Further, the normal image P1' and the polarized image P2' are taken simultaneously. The processed image P3' is thus not blurred. As a result, the pixels, which are used to increase the resolution normally and the brightness, are used effectively. It is possible to take an unprecedented image while the resolution is not decreased and the brightness signal is corrected appropriately. Note that, as described above, the pixels, which are subjected to the polarization processing to obtain a polarized image, may not be green pixels or white pixels. Pixels of another color may be subjected to the polarization processing as long as the color of the pixels has a great effect on brightness. Further, the color combination may not be the combination of red, green, and blue pixels, or may not be the combination of red, green, blue, and white pixels. Alternatively, other pixel color combination (e.g., ClearVid array, X-Trance array, hex array, or the like) may be employed. Further, the color combination may not be the additive combination of three primary colors (red, green, and blue pixels), or may not be the color combination of the red, green, blue, and white pixels. For example, the subtractive combination of three primary colors (magenta, cyan, and yellow pixels) may be employed as the color combination.

Eighth Embodiment

Figure 14:
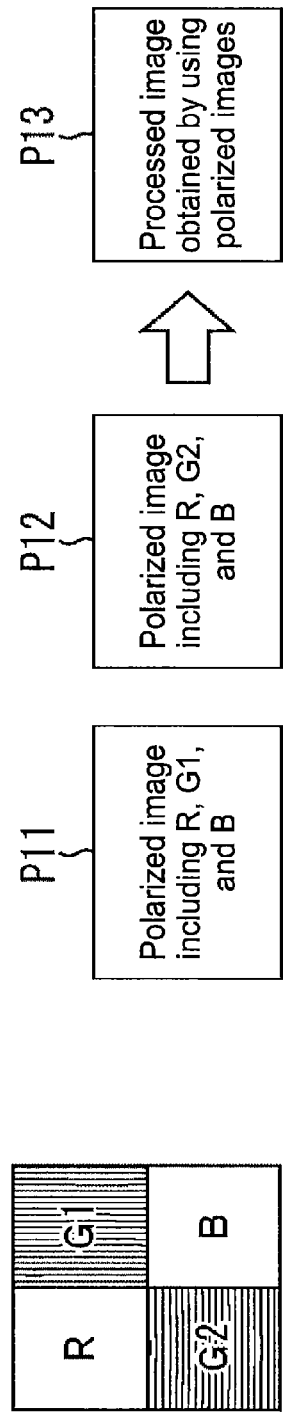
FIG. 14 is a diagram illustrating an example of applying polarization processing to first and second green pixels, and generating a processed image having no blown-out highlights and no blocked-up shadows based on a first polarized image including red pixels, blue pixels, and first green pixels, and based on a second polarized image including red pixels, blue pixels, and second green pixels.

In the above-mentioned example of the sixth embodiment, only the second green pixels G2 of the checkered pixel array are subjected to the horizontal-polarization control. The thus obtained image is the polarized image P2. At the same time, the normal image P1 including the other pixels (i.e., red pixels R, first green pixels G1, and blue pixels B) is taken under the normal condition. The processed image P3 is generated. The processed image P3 includes the pixels each having higher activity. In the above-mentioned example of the seventh embodiment, only the white pixels W of the checkered pixel array are subjected to the horizontal-polarization control. The thus obtained image is the polarized image P2'. At the same time, the normal image P1' including the other pixels (i.e., red pixels R, green pixels G, and blue pixels B) is taken under the normal condition. The processed image P3' is generated. The processed image P3' includes the pixels each having higher activity. However, for example, as shown in FIG. 14, the first green pixels G1 may be subjected to the polarization control in the perpendicular direction. The second green pixels G2 may be subjected to the polarization control in the horizontal direction. An image including the red pixels R and the blue pixels B may be taken under the normal condition. The polarized image P11 and the polarized image P12 may be generated. The polarized image P11 includes the red pixels R, the first green pixels G1, and the blue pixels B. The polarized image P11 is subjected to the perpendicular-polarization processing. The polarized image P12 includes the red pixels R, the second green pixels G2, and the blue pixels B. The polarized image P12 is subjected to the horizontal-polarization processing.

That is, the controller 54a applies the perpendicular-polarization control to the first green pixels G1. The controller 54a applies the horizontal-polarization control to the second green pixels G2. An image including the red pixels R and the blue pixels B is taken under the normal condition. The first polarized image P11 and the second polarized image P12 are taken. The first polarized image P11 includes the red pixels R, the first green pixels G1, and the blue pixels B. The second polarized image P12 includes the red pixels R, the second green pixels G2, and the blue pixels B.

Then, the optimizer 54b compares the activity of each pixel of the first polarized image P11 with the activity of the corresponding pixel of the second polarized image P12. The optimizer 54b extracts the pixels each having higher activity. The optimizer 54b obtains the processed image P13 including the extracted pixels based on the polarized images. As a result, it is possible to generate a processed image based on the first and second polarized images P11 and P12. The first polarized image P11 is subjected to the polarization control in the perpendicular direction. The second polarized image P12 is subjected to the polarization control in the horizontal direction. As a result, it is possible to take an unprecedented image while the resolution is not decreased and the brightness signal is corrected appropriately.

Ninth Embodiment

Figure 15:
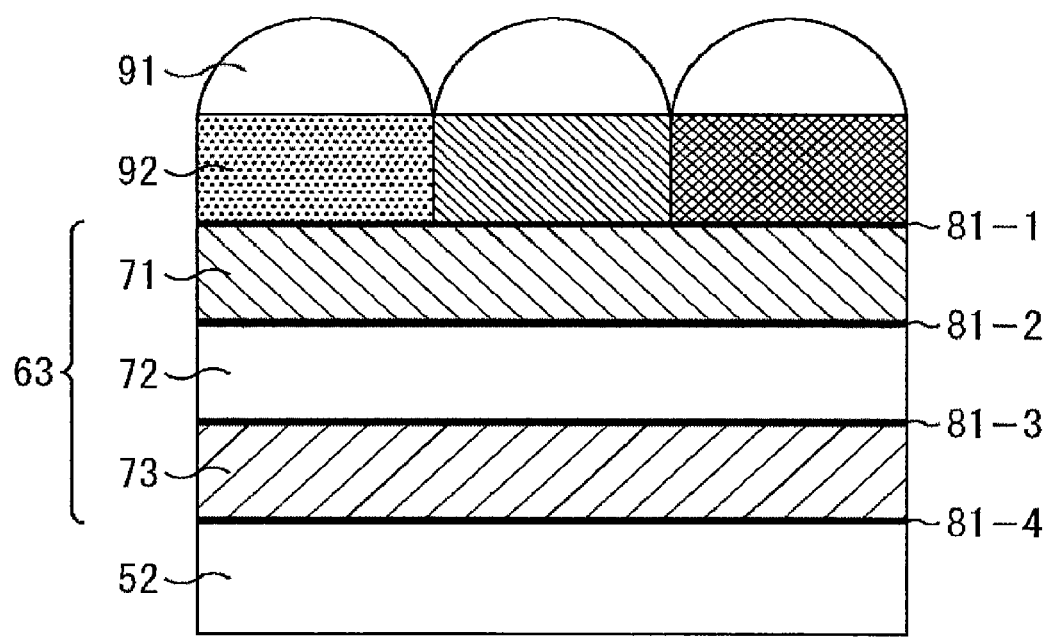
FIG. 15 is a diagram illustrating an example of providing the color filters and the on-chip lenses in front of a TN liquid crystal.

In the examples of the above-mentioned embodiments, the on-chip lenses 91 and the color filters 92 are provided between the image pickup device 52 and the polarization control device 63. Any other structure may be employed as long as the TN liquid crystal layer 71 is provided in front of the GH liquid crystal layers 72 and 73. For example, as shown in FIG. 15, the on-chip lenses 91 and the color filters 92 may be provided in front of the polarization control device 63.

Tenth Embodiment

Figure 16:
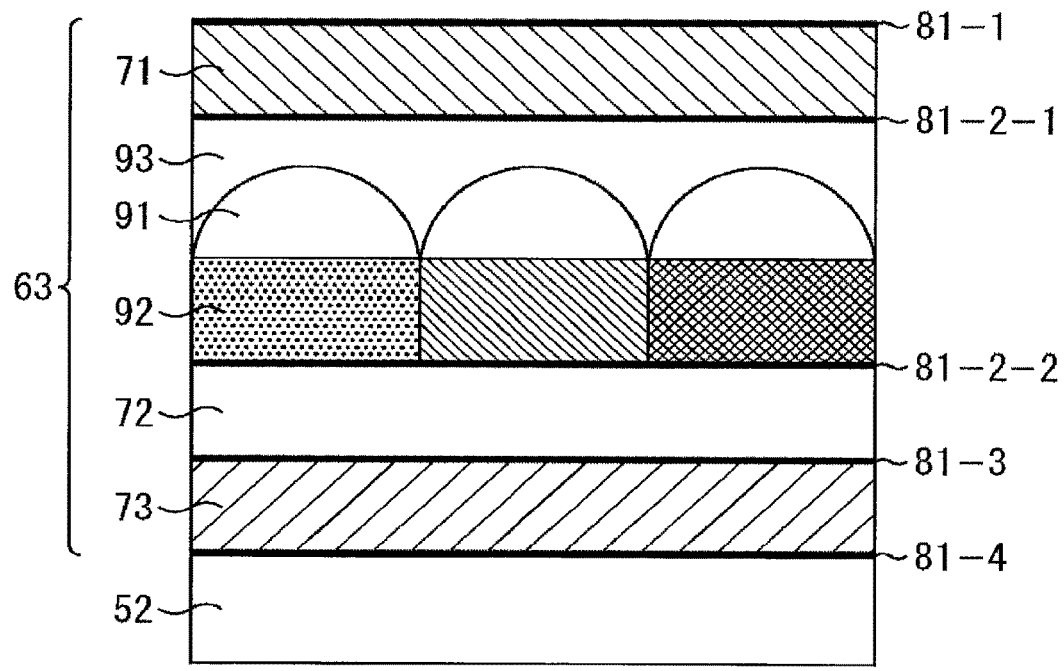
FIG. 16 is a diagram illustrating an example of providing the color filters and the on-chip lenses between the TN liquid crystal and the GH liquid crystals.

Similarly, for example, as shown in FIG. 16, the on-chip lenses 91 and the color filters 92 may be provided between the TN liquid crystal layer 71 and the GH liquid crystal layer 72. In this case, the polarization control device 63 includes the TN liquid crystal layer 71, the GH liquid crystal layers 72 and 73, the on-chip lenses 91, the color filters 92, and the space (transparent layer) 93 as a whole. Further, the ITO electrode layers 81-1 and 81-2-1 control the TN liquid crystal layer 71. The ITO electrode layers 81-2-2 and 81-3 control the GH liquid crystal layer 72.

Eleventh Embodiment

Figure 17:
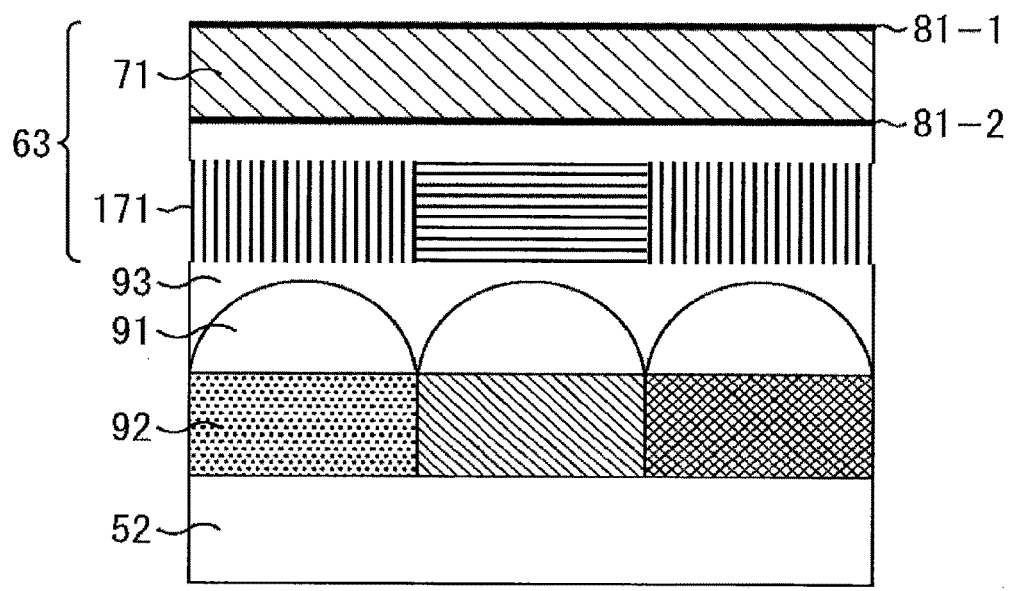
FIG. 17 is a diagram illustrating an example of using a polarization-removing structural layer.

In the examples of the above-mentioned embodiments, the GH liquid crystal layers 72 and 73 are provided to remove polarization components. The GH liquid crystal layer 72 extracts the perpendicular component. The GH liquid crystal layer 73 extracts the horizontal component. Alternatively, any other structure may be employed as long as it is possible to remove polarization components. For example, as shown in FIG. 17, the GH liquid crystal layers 72 and 73 are not provided. Instead, the polarization-removing structural layer 171 may be provided. The polarization-removing structural layer 171 is a wire-grid polarizer.

Figure 18:
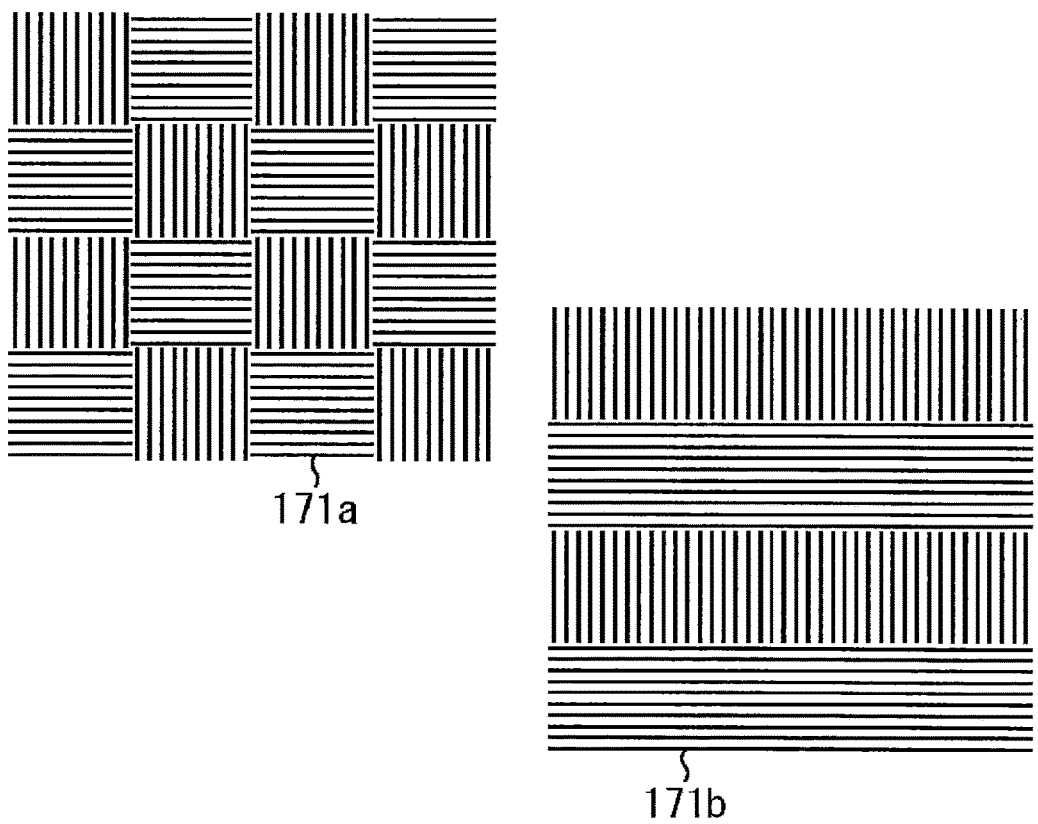
FIG. 18 is a diagram illustrating types of the polarization-removing structural layer.

Here, the polarization-removing structural layer 171 is a wire-grid polarizer. The wire-grid polarizer absorbs and reflects the polarization component, which is in parallel with the grid direction of the polarizer. The wire-grid polarizer transmits the perpendicular polarization component. An image pickup device detects the perpendicular polarization component. As shown in the left part of FIG. 18, the polarization-removing structural layer 171a is an example of the polarization-removing structural layer 171. The polarization-removing structural layer 171a is configured to detect the horizontal and perpendicular polarization components or to determine pixels for each of a plurality of areas each including a plurality of grid-like pixels or for each pixel. Further, as shown in the fight part of FIG. 18, the polarization-removing structural layer 171b is an example of the polarization-removing structural layer 171. The polarization-removing structural layer 171b is configured to detect the horizontal and perpendicular polarization components or to determine pixels for each of a plurality of areas each including a plurality of band-like pixels or for each pixel.

The wire grid of the polarization-removing structural layer 171 is fixed. This is different from the GH liquid crystal layers 72 and 73. Because of this structure, polarization is always detected when taking a picture. Further, the polarization-removing structural layer 171 is likely to be thinner than the GH liquid crystal layers 72 and 73 because of the wire grid. As a result, it is possible to reduce influence on an oblique-incident light in a case where the polarization-removing structural layer 171 is arrayed for each pixel. Note that Japanese Patent Application Laid-open No. 2012-54856 discloses a polarization-removing structural layer that employs a wire-grid polarizer.

Further, the camera 41 of each of the above-mentioned first embodiment to eleventh embodiment may include the polarization-removing structural layer 171 instead of the GH liquid crystal layers 72 and 73. Further, in the above-mentioned embodiments, the GH liquid crystal layers 72 and 73 extract orthogonal polarization components. The wire-grid polarization-removing structural layer 171 extracts orthogonal polarization components. Alternatively, any structure may be employed as long as it is possible to detect different polarization components. The GH liquid crystal layers 72 and 73 may extract two or more different polarization components. The wire-grid polarization-removing structural layer 171 may extract two or more different polarization components.

As described above, according to the present technology, it is possible to rotate the polarization of the objective world depending on the inclination of the camera 41. It is possible to extract an arbitrary polarization components when taking an image and when modulating light and taking an image. Further, in a case where incident angles of key light on a plane are different from each other, the TN liquid crystal layer is divided into a plurality of areas, and the driving amount of the TN liquid crystal layer is controlled independently for each area. As a result, it is possible to correct the polarization rotation amount on a plane. It is possible to maintain the in-plane uniformity under the polarization state.

Further, a first GH liquid crystal layer removes P-polarization and a second GH liquid crystal layer removes S-polarization, and vice versa. The two GH liquid crystal layers are driven independently. As a result, it is possible to detect an image having arbitrary polarization components of the objective world. Further, if both the two GH liquid crystal layers are driven, they may function as a ND filter when modulating light and taking an image. Further, detected component images including one/two polarization (s) are combined and processed appropriately while blown-out highlights and blocked-up shadows are prevented from occurring. As a result, it is possible to optimize an image, and to obtain an image in which objects are discriminated from each other.

Further, the polarization control device is provided on the image pickup device. As a result, it is possible to obtain a filter effect for each pixel or for each area. Further, the two GH liquid crystal layers are driven simultaneously for each pixel or for each area. As a result, it is possible to reduce light of a partially brighter area (e.g., sky, water surface, light source, etc.).

Meanwhile, the above-mentioned series of processing may be executed by hardware or software. In the case where the series of processing is executed by software, a program configuring the software is installed in a computer from a storage medium. For example, the computer is a computer, which is built in a dedicated hardware. Alternatively, for example, the computer is a general-purpose personal computer, which is capable of executing various functions when various programs are installed.

FIG. 19 is an example of the configuration of a general-purpose personal computer. The personal computer includes a built-in CPU (Central Processing Unit) 1001. The CPU 1001 is connected to the input/output interface 1005 via the bus 1004. The ROM (Read Only Memory) 1002 and the RAM (Random Access Memory) 1003 are connected to the bus 1004.

The input unit 1006, the output unit 1007, the storage 1008, and the communication unit 1009 are connected to the input/output interface 1005. The input unit 1006 includes input devices such as a keyboard and a mouse. A user inputs operation commands in the input devices. The output unit 1007 outputs processing operation windows and images resulting from processing to a display device. The storage 1008 includes a hard disk drive and the like, which store programs and various kinds of data. The communication unit 1009 includes a LAN (Local Area Network) adaptor and the like. The communication unit 1009 performs communication processing via a network typified by the Internet. Further, the drive 1010 is connected to the input/output interface 1005. The drive 1010 writes data in the removal medium 1011, and retrieves data from the removal medium 1011. Examples of the removal medium 1011 include a magnetic disk (including flexible disk), an optical disk (including CD-ROM (Compact Disc-Read Only Memory) and DVD (Digital Versatile Disc)), a magnetooptical disk (including MD (Mini Disc)), a semiconductor memory, and the like.

The CPU 1001 executes various kinds of processing in response to a program stored in the ROM 1002. Further, the CPU 1001 retrieves a program from the removal medium 1011 such as a magnetic disk, an optical disk, a magnetooptical disk, a semiconductor memory, or the like. The CPU 1001 installs the retrieved program in the storage 1008. The CPU 1001 loads the program in the RAM 1003 from the storage 1008. The CPU 1001 executes various kinds of processing in response to the program loaded in the RAM 1003. Further, the RAM 1003 arbitrarily stores data necessary for the CPU 1001 to execute various kinds of processing, and other data.

In the computer configured as described above, the CPU 1001 loads a program stored in, for example, the storage 1008 in the RAM 1003 via the input/output interface 1005 and the bus 1004, and executes the program. The CPU 1001 thus executes the above-mentioned series of processing.

For example, the program executed by the computer (the CPU 1001) may be stored in the removal medium 1011, and provided as a packaged medium or the like. Further, the program may be provided via a wired/wireless transmission medium such as a local area network, the Internet, or a digital satellite broadcasting.

The removal medium 1011 may be inserted in the drive 1010 of the computer, and the program may thus be installed in the storage 1008 via the input/output interface 1005. Further, the communication unit 1009 may receive the program via a wired/wireless transmission medium, and the program may be installed in the storage 1008. Alternatively, the program may be installed in the ROM 1002 or the storage 1008 previously.

Note that the computer may execute processing in time series in the order described in the specification in response to a program. Alternatively, the computer may execute processing in parallel in response to a program. Alternatively, the computer may execute processing at necessary timing (e.g., when program is called) in response to a program.

Further, the embodiments of the present technology are not limited to the above-mentioned embodiments. The embodiments of the present technology may be variously modified within the scope of the present technology.

For example, the present technology may be configured as cloud computing. In the cloud computing, a plurality of apparatuses share and cooperatively process one function via a network.

Further, one apparatus may execute the steps described with reference to the above-mentioned flowchart. Alternatively, a plurality of apparatuses may share and execute the steps.

Further, if one step includes a plurality of kinds of processing, one apparatus may execute the plurality of kinds of processing in the step. Alternatively, a plurality of apparatuses may share and execute the processing.

Further, the present technology may employ the following structures.

(1) An image pickup apparatus, comprising:

a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element;
a polarizer layer provided in front of the polarization removing element layer, the polarizer layer being configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polarization axis of light depending on the inclination detected by the inclination detecting device and transmits the light; and
an image pickup device configured to detect the light passing through the polarization removing element layer.

(2) The image pickup apparatus according to (1), wherein the polarizer layer includes a twisted nematic liquid crystal layer.

(3) The image pickup apparatus according to (1), wherein the controller is configured to control a twist angle of nematic liquid crystal molecules in the twisted nematic liquid crystal layer between about 0 degrees to 270 degrees depending on the inclination detected by the inclination detecting device.

(4) The image pickup apparatus according to (3), further comprising:
matrix wiring configured to apply voltage to the twisted nematic liquid crystal layer.

(5) The image pickup apparatus according to (4), wherein the twisted nematic liquid crystal layer is divided into a plurality of areas, each of the plurality of areas corresponding to at least one pixel, the wiring being arranged in the matrix form such that the wiring corresponds to the plurality of areas.

(6) The image pickup apparatus according to (5), further comprising:
an optimizer processor configured to apply subtraction, enhancement, and correction processing to an image detected by the image pickup device, wherein
a pixel array includes a pixel of at least one color having a great effect on brightness, and includes pixels having color combination of at least three colors,
the controller is configured to drive the polarization removing element layer and the polarizer layer corresponding to a pixel area of the color having a great effect on brightness, and
the optimizer processor is configured
to compare activity of each pixel of a polarized image with activity of the corresponding pixel of a normal image, the polarized image being taken under a state where the polarizer layer is driven and including a pixel of a color having a great effect on brightness, the normal image being taken and including pixels excluding the pixel of the color having a great effect on brightness out of the pixels having color combination of at least three colors, and
to generate a processed image including pixels each having higher activity.

(7) The image pickup apparatus according to (6), wherein the pixel array is checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line,
the controller is configured to drive the polarization removing element layer and the polarizer layer corresponding to the pixel area of the second green pixel, and
the optimizer processor is configured
to compare activity of each pixel of a polarized image with activity of the corresponding pixel of a normal image, the polarized image being taken under a state where the polarizer layer is driven and including the second green pixel, the normal image being taken and including the red pixel, the blue pixel, and the first green pixel, and
to generate a processed image including pixels each having higher activity.

(8) The image pickup apparatus according to (6), wherein the pixel array includes two pixels in a horizontal direction and two pixels in a perpendicular direction for each unit, the pixel array including a red pixel, a blue pixel, a green pixel, and a white pixel,
the controller is configured to drive the polarization removing element layer and the polarizer layer corresponding to the pixel area of the white pixel, and
the optimizer processor is configured
to compare activity of each pixel of a polarized image with activity of the corresponding pixel of a normal image, the polarized image being taken under a state where the polarizer layer is driven and including the white pixel, the normal image being taken and including the red pixel, the blue pixel, and the green pixel, and
to generate a processed image including pixels each having higher activity.

(9) The image pickup apparatus according to (6), wherein the pixel array is checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line,
the controller is configured
to drive the polarization removing element layer corresponding to the pixel area of the first green pixel in one direction, and the polarization removing element layer corresponding to the pixel area of the second green pixel in a direction orthogonal to the one direction, and
to drive the polarizer layer, and
the optimizer processor is configured
to compare activity of each pixel of a first polarized image with activity of the corresponding pixel of a second polarized image, the first polarized image including the first green pixel, the red pixel, and the blue pixel, the second polarized image including the second green pixel, the red pixel, and the blue pixel, and
to generate a processed image including pixels each having higher activity.

(10) The image pickup apparatus according to (1), wherein each of the polarization removing elements includes a Guest-Host liquid crystal.

(11) The image pickup apparatus according to (10), wherein the controller is configured to drive at least one Guest-Host liquid crystal out of the plurality of Guest-Host liquid crystals being the plurality of polarization removing elements.

(12) The image pickup apparatus according to (1), wherein the plurality of polarization removing elements are two polarization removing elements, a polarization axis of one polarization removing element being orthogonal to a polarization axis of the other polarization removing element.

(13) The image pickup apparatus according to (1), further comprising:
an optimizer processor configured to apply subtraction, enhancement, and correction processing to an image detected by the image pickup device.

(14) The image pickup apparatus according to (1), wherein
a transparent layer is provided on an image pickup device, a refractive index of the transparent layer being lower than a refractive index of an on-chip lens, the on-chip lens being structured on a pixel of the image pickup device, the polarizer being arranged in front of the transparent layer having the lower refractive index.

(15) The image pickup apparatus according to (1), wherein the polarization removing element includes a wire-grid polarizer.

(16) An image pickup method, executed by an image pickup apparatus including
a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element,
a polarizer layer provided in front of the polarization removing element layer, the polarizer layer being configured to twist polarization axes of light having a plurality of polarization axes by predetermined angles, respectively, and to transmit the light,
an inclination detecting device configured to detect inclination of the incident light to an optical axis,
a controller configured to control and drive the polarizer layer such that the polarizer layer twists the polarization axis of light depending on the inclination detected by the inclination detecting device and transmits the light, and
an image pickup device configured to detect the light passing through the polarization removing element layer,
the method comprising:
detecting, by the inclination detecting device, inclination of the incident light to an optical axis;
controlling and driving, by the controller, the polarizer layer such that the polarizer layer twists the polarization axis of light depending on the inclination detected by the inclination detecting device and transmits the light; and
detecting, by the image pickup device, the light passing through the polarization removing element layer.

(17) A program, causing a computer configured to control an image pickup apparatus including
a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element,
a polarizer layer provided in front of the polarization removing element layer, the polarizer layer being configured to twist polarization axes of light having a plurality of polarization axes by predetermined angles, respectively, and to transmit the light,
an inclination detecting device configured to detect inclination of the incident light to an optical axis,
a controller configured to control and drive the polarizer layer such that the polarizer layer twists the polarization axis of light depending on the inclination detected by the inclination detecting device and transmits the light, and
an image pickup device configured to detect the light passing through the polarization removing element layer,
to execute the steps of:
detecting, by the inclination detecting device, inclination of the incident light to an optical axis;
controlling and driving, by the controller, the polarizer layer such that the polarizer layer twists the polarization axis of light depending on the inclination detected by the inclination detecting device and transmits the light; and
detecting, by the image pickup device, the light passing through the polarization removing element layer.

(18) A camera system, comprising:
a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element;
a polarizer layer provided in front of the polarization removing element layer, the polarizer layer being configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polarization axis of light depending on the inclination detected by the inclination detecting device and transmits the light; and
an image pickup device configured to detect the light passing through the polarization removing element layer.

(19) A camera main body, comprising:
a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element;
a polarizer layer provided in front of the polarization removing element layer, the polarizer layer being configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polarization axis of light depending on the inclination detected by the inclination detecting device and transmits the light; and
an image pickup device configured to detect the light passing through the polarization removing element layer.

It should be understood by those skilled in the art that various modifications, combinations, sub-combinations and alterations may occur depending on design requirements and other factors insofar as they are within the scope of the appended claims or the equivalents thereof.

The invention claimed is:
1. An image pickup apparatus, comprising:
a polarizer layer configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polariza- tion axis of light depending on the inclination detected by the inclination detecting device and transmits the light; and an image pickup device configured to detect the light passing through the polarizer layer.

2. The image pickup apparatus according to claim 1, wherein the polarizer layer includes a twisted nematic liquid crystal layer.

3. The image pickup apparatus according to claim 1, wherein the controller is configured to control a twist angle of nematic liquid crystal molecules in the twisted nematic liquid crystal layer between about 0 degrees to 270 degrees depending on the inclination detected by the inclination detecting device.

4. The image pickup apparatus according to claim 3, further comprising: matrix wiring configured to apply voltage to the twisted nematic liquid crystal layer.

5. The image pickup apparatus according to claim 4, wherein the twisted nematic liquid crystal layer is divided into a plurality of areas, each of the plurality of areas corresponding to at least one pixel, the wiring being arranged in the matrix form such that the wiring corresponds to the plurality of areas.

6. The image pickup apparatus according to claim 5, further comprising:

a polarization removing element layer; and an optimizer processor configured to apply subtraction, enhancement, and correction processing to an image detected by the image pickup device, wherein a pixel array includes a pixel of at least one color having a great effect on brightness, and includes pixels having color combination of at least three colors, the controller is configured to drive the polarization removing element layer and the polarizer layer corresponding to a pixel area of the color having a great effect on brightness, and the optimizer processor is configured to compare activity of each pixel of a polarized image with activity of the corresponding pixel of a normal image, the polarized image being taken under a state where the polarizer layer is driven and including a pixel of a color having a great effect on brightness, the normal image being taken and including pixels excluding the pixel of the color having a great effect on brightness out of the pixels having color combination of at least three colors, and to generate a processed image including pixels each having higher activity.

7. The image pickup apparatus according to claim 6, wherein the pixel array is checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line, the controller is configured to drive the polarization removing element layer and the polarizer layer corresponding to the pixel area of the second green pixel, and the optimizer processor is configured to compare activity of each pixel of a polarized image with activity of the corresponding pixel of a normal image, the polarized image being taken under a state where the polarizer layer is driven and including the second green pixel, the normal image being taken and including the red pixel, the blue pixel, and the first green pixel, and to generate a processed image including pixels each having higher activity.

8. The image pickup apparatus according to claim 6, wherein the pixel array includes two pixels in a horizontal direction and two pixels in a perpendicular direction for each unit, the pixel array including a red pixel, a blue pixel, a green pixel, and a white pixel, the controller is configured to drive the polarization removing element layer and the polarizer layer corresponding to the pixel area of the white pixel, and the optimizer processor is configured to compare activity of each pixel of a polarized image with activity of the corresponding pixel of a normal image, the polarized image being taken under a state where the polarizer layer is driven and including the white pixel, the normal image being taken and including the red pixel, the blue pixel, and the green pixel, and to generate a processed image including pixels each having higher activity.

9. The image pickup apparatus according to claim 6, wherein the pixel array is checkered, the pixel array including two pixels in a horizontal direction and two pixels in a perpendicular direction for each unit, a red pixel and a blue pixel being arranged on one diagonal line, a first green pixel and a second green pixel being arranged on the other diagonal line different from the one diagonal line, the controller is configured to drive the polarization removing element layer corresponding to the pixel area of the first green pixel in one direction, and the polarization removing element layer corresponding to the pixel area of the second green pixel in a direction orthogonal to the one direction, and to drive the polarizer layer, and the optimizer processor is configured to compare activity of each pixel of a first polarized image with activity of the corresponding pixel of a second polarized image, the first polarized image including the first green pixel, the red pixel, and the blue pixel, the second polarized image including the second green pixel, the red pixel, and the blue pixel, and to generate a processed image including pixels each having higher activity.

10. The image pickup apparatus according to claim 1, further comprising:

a polarization removing element layer including a plurality of polarization removing elements, wherein each of the polarization removing elements includes a Guest-Host liquid crystal.

11. The image pickup apparatus according to claim 10, wherein the controller is configured to drive at least one Guest-Host liquid crystal out of the plurality of Guest-Host liquid crystals being the plurality of polarization removing elements.

12. The image pickup apparatus according to claim 1, further comprising:

a polarization removing element layer including two polarization removing elements, a polarization axis of one polarization removing element being orthogonal to a polarization axis of the other polarization removing element.

13. The image pickup apparatus according to claim 1, further comprising: an optimizer processor configured to apply subtraction, enhancement, and correction processing to an image detected by the image pickup device.

14. The image pickup apparatus according to claim 1, wherein a transparent layer is provided on an image pickup device, a refractive index of the transparent layer being lower than a refractive index of an on-chip lens, the on-chip lens being structured on a pixel of the image pickup device, the polarizer being arranged in front of the transparent layer having the lower refractive index.

15. The image pickup apparatus according to claim 1, wherein the polarizer layer includes a wire-grid polarizer.

16. An image pickup method, executed by an image pickup apparatus including a polarizer layer configured to twist polarization axes of light having a plurality of polarization axes by predetermined angles, respectively, and to transmit the light, an inclination detecting device configured to detect inclination of the incident light to an optical axis, a controller configured to control and drive the polarizer layer such that the polarizer layer twists the polarization axis of light depending on the inclination detected by the inclination detecting device and transmits the light, and an image pickup device configured to detect the light passing through the polarization removing element layer, the method comprising:
detecting, by the inclination detecting device, inclination of the incident light to an optical axis;
controlling and driving, by the controller, the polarizer layer such that the polarizer layer twists the polarization axis of light depending on the inclination detected by the inclination detecting device and transmits the light; and
detecting, by the image pickup device, the light passing through the polarizer layer.

17. A non-transitory computer readable medium containing a program that, when executed, causes a computer configured to control an image pickup apparatus including a polarizer layer configured to twist polarization axes of light having a plurality of polarization axes by predetermined angles, respectively, and to transmit the light, an inclination detecting device configured to detect inclination of the incident light to an optical axis, a controller configured to control and drive the polarizer layer such that the polarizer layer twists the polarization axis of light depending on the inclination detected by the inclination detecting device and transmits the light, and an image pickup device configured to detect the light passing through the polarization removing element layer, to execute the operations of:
detecting, by the inclination detecting device, inclination of the incident light to an optical axis;
controlling and driving, by the controller, the polarizer layer such that the polarizer layer twists the polarization axis of light depending on the inclination detected by the inclination detecting device and transmits the light; and
detecting, by the image pickup device, the light passing through the polarizer layer.

18. A camera system, comprising:
a polarizer layer configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polarization axis of light depending on the inclination detected by the inclination detecting device and transmits the light; and
an image pickup device configured to detect the light passing through the polarizer layer.

19. A camera main body, comprising:
a polarizer layer configured to twist polarization axes of light having a plurality of polarization axes by predetermined angles, respectively, and to transmit the light;
an inclination detecting device configured to detect inclination of the incident light to an optical axis;
a controller configured to control and drive the polarizer layer such that the polarizer layer twists the polarization axis of light depending on the inclination detected by the inclination detecting device and transmits the light; and
an image pickup device configured to detect the light passing through the polarizer layer.

20. The image pickup apparatus according to claim 1, further comprising a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element.

21. The image pickup apparatus according to claim 1, further comprising:
a pixel array including a unit pixel having two subpixels in a horizontal direction and two subpixels in a vertical direction, wherein
respective ones of the subpixels have a corresponding color filter and a corresponding polarizer sublayer of the polarizer layer,
each color filter corresponds to the same color, and
each polarizer sublayer corresponds to a different polarization axis.

22. The image pickup method according to claim 16, wherein the image pickup apparatus further includes a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element.

23. The non-transitory computer readable medium according to claim 17, wherein the image pickup apparatus further includes a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element.

24. The camera system according to claim 18, further comprising a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element.

25. The camera main body according to claim 19, further comprising a polarization removing element layer including a plurality of polarization removing elements, each of the plurality of polarization removing elements being configured to polarize an incident light to thereby obtain light having a polarization axis in a predetermined direction and to transmit the polarized light, the polarization axis of one polarization removing element intersecting with the polarization axis of another polarization removing element.

* * * * *